(12) United States Patent
Chen et al.

(10) Patent No.: US 8,270,821 B2
(45) Date of Patent: Sep. 18, 2012

(54) MEDIA DATA PLAYBACK DEVICE AND REPLAY METHOD THEREOF

(75) Inventors: Chen-Sheng Chen, Taipei Hsien (TW); Deng-Rung Liu, Taipei Hsien (TW); Chi-Chang Lu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 361 days.

(21) Appl. No.: 12/770,733

(22) Filed: Apr. 30, 2010

(65) Prior Publication Data
US 2011/0243522 A1   Oct. 6, 2011

(51) Int. Cl.
*H04N 5/93*   (2006.01)

(52) U.S. Cl. .................................. 386/354; 386/353
(58) Field of Classification Search .................. None
See application file for complete search history.

(56) References Cited

FOREIGN PATENT DOCUMENTS
TW   200709681   3/2007

*Primary Examiner* — William C Vaughn, Jr.
*Assistant Examiner* — Eileen Adams
(74) *Attorney, Agent, or Firm* — Altis Law Gorup, Inc.

(57) ABSTRACT

A media data playback device is capable of simultaneously parsing and decoding two different sections of streaming media, one of which comprises a replay section. The device shows replay progress of the replay section on a progress bar and allows switching positions during replaying of the replay section.

18 Claims, 20 Drawing Sheets

MEDIA DATA PLAYBACK DEVICE AND REPLAY METHOD THEREOF

BACKGROUND

1. Technical Field

The disclosure relates to computer technologies, and more particularly to a media data playback system and replay method thereof.

2. Description of Related Art

TV receivers, known as set-top boxes, manage the higher channel numbers not supported by TVs, descramble, decrypt, and decode channel signals into rich video content and other information such as a program guide. A digital set-top box may have a built-in hard drive for recording and playing back TV programs. This function is helpful in executing a demand to replay a particular portion of a video clip. Some set-top boxes may feature large hard drive capacity for recording more content. Depending on length of video content, however, it may be difficult to find and play a particular desired portion of the video.

DETAILED DESCRIPTION

Descriptions of exemplary embodiments of a media data playback device and replay method thereof are given in the following paragraphs which are organized as follows:

1. System Overview
   1.1 Exemplary Reader Device
2. Exemplary operations of the media data playback device
   2.1 Showing replay progress
   2.2 Progress based on PCR
   2.3 Progress based on PTS
   2.4 Progress based on DTS
   2.5 Locating presentation unit
   2.6 Clipping replay media
   2.7 Platform independent UI
3. Replay position switching
   3.1 Positioning Method
   3.2 First exemplary Embodiment of the Positioning Method
   3.3 Second exemplary Embodiment of the Positioning Method
   3.4 Third exemplary Embodiment of the Positioning Method
4. Conclusion

1. System Overview

The disclosed media data playback device 100 can be implemented as a stand-alone device or integrated in various media data playback devices, such as a set top box, a cell phone, a tablet personal computer (PC), a laptop computer, a monitor, a multimedia player, a digital camera, a personal digital assistant (PDA), a navigation device or a mobile internet device (MID).

1.1 Exemplary Reader Device

Figure 1:
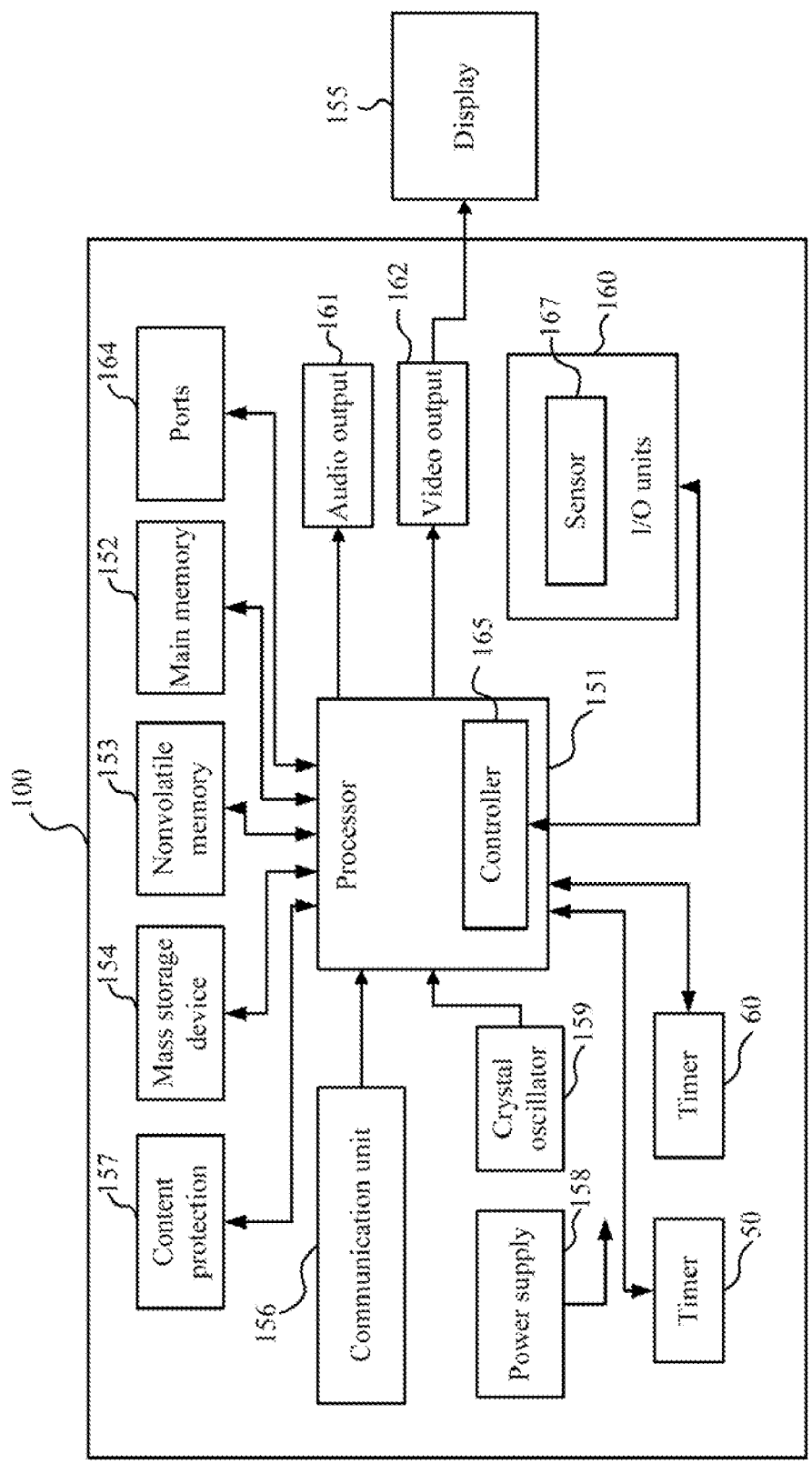
FIG. 1 is a block diagram of an exemplary embodiment of a media data playback device.

With reference to FIG. 1, a processor 151 comprises a central processing unit of the media data playback device 100. The processor 151 may comprise various integrated circuits (ICs) for processing data and machine-readable instructions. Connection of the components in the device 100 is shown in FIG. 1 and may comprise serial or parallel transmission buses, or wireless communication channels. A communication unit 156 establishes communication channels through which the device 100 may connect to and download media data streams from a remote station. Additionally, the communication unit 156 may establish wireless communication channels through which a portable device, such as a remote control, may connect to and exchange data with the device 100. The communication unit 156 may comprise antennas, base band, and radio frequency (RF) chipsets for wireless local area network (LAN) communication and/or cellular communication such as wideband code division multiple access (W-CDMA) and high speed downlink packet access (HSDPA). Through the established wireless communication channels, the device 100 may serve as a wireless LAN access point through which the portable device connects to the Internet.

The processor 151 may be packaged as a chip or comprise a plurality of chips interconnected through buses. For example, the processor 151 may only comprise a central processing unit (CPU) or a combination of a CPU, a digital signal processor (DSP), and a communication controller chip, such as a chip of the communication unit 156. The communication controller may comprise one or more controllers of wired or wireless communication, such as for cellular, infrared, Bluetooth™, or wireless local area network (LAN) communication. The communication controller coordinates communication among components of the device 100 or communication between the device 100 and external devices.

A power supply 158 provides electrical power to components of the device 100. A crystal oscillator 159 provides clock signals to the processor 151 and other components of the device 100. The timers 50 and 60 keep track of predetermined time intervals and may comprise circuits, machine-readable programs, or a combination thereof. Each of the timers 50 and 60 generates signals to give notification of expiration of the predetermined time intervals. Input and output (I/O) units 160 may comprise control buttons, an alphanumeric keypad, a touch panel, a touch screen, and a plurality of light emitting diodes (LEDs). A controller 165 detects operations on the I/O units 160 and transmits signals indicative of the detected operation to the processor 151. The controller 165 also controls operations of the I/O units 160. The processor 151 may control the I/O units 160 through the controller 165. Ports 164 may be used to connect to various computerized interfaces, such as an external computer, or a peripheral device. The ports 164 may comprise physical ports complying with universal serial bus (USB) and IEEE 1394 standards, recommended standard 232 (RS-232) and/or recommended standard 11 (RS-11) defined by Electronics Industries Association (EIA), serial ATA (SATA), and/or high-definition multimedia interface (HDMI).

Nonvolatile memory 153 stores an operating system and applications executable by the processor 151. The processor 151 may load runtime processes and data from the nonvolatile memory 153 to the main memory 152 and store digital content in a mass storage device 154. The device 100 may obtain digital content such as e-books through the communication unit 156. The main memory 152 may comprise a random access memory (RAM), such as static RAM (SRAM) or dynamic RAM (DRAM). The nonvolatile memory 153 may comprise an electrically erasable programmable read-only memory (EEPROM) or a flash memory, such as a NOR flash or a NAND flash.

A content protection system 157 provides access control to digital content reproduced by the device 100. The content protection system 157 may comprise memory and necessary devices for implementing digital video broadcasting—common interface (DVB-CI) and/or conditional access (CA). The device 100 may obtain digital content from broadcast signals through an antenna, a tuner, and a demodulator. Alternatively, the device 100 may obtain digital content from an information network, such as the Internet, through a network interface.

A video output unit 162 comprises filters and amplifiers for filtering and amplifying video signals output by the processor 151. An audio output unit 161 comprises a digital to analog converter converting audio signals output by the processor 151 from digital format to analog format.

A display 155 is operable to display text and images, and may comprise e-paper, organic light emitting diodes (OLED), a field emission display (FED), or a liquid crystal display (LCD). Alternatively, the display 155 may comprise a reflective display, such as an electrophoretic display, an electrofluidic display, or a display using interferometric modulation. The display 155 may display various graphical user interfaces (GUIs) as virtual controls including but not limited to windows, scroll bars, icons, and clipboards. The display 155 may comprise a single display or a plurality of displays in different sizes. The processor 151 may present various GUIs on the display 155 as detailed in the following paragraphs.

The I/O units 160 comprise a touch sensor 167 operable to detect touch operations on the display 155. The touch sensor 167 may comprise a transparent touch pad overlaid on the display 155 or arrays of optical touch transmitters and receivers located on the boarder of the display 155, such as those disclosed in US patent publication No. 20090189878.

2. Exemplary Operations of the Media Data Playback Device

Figure 2:
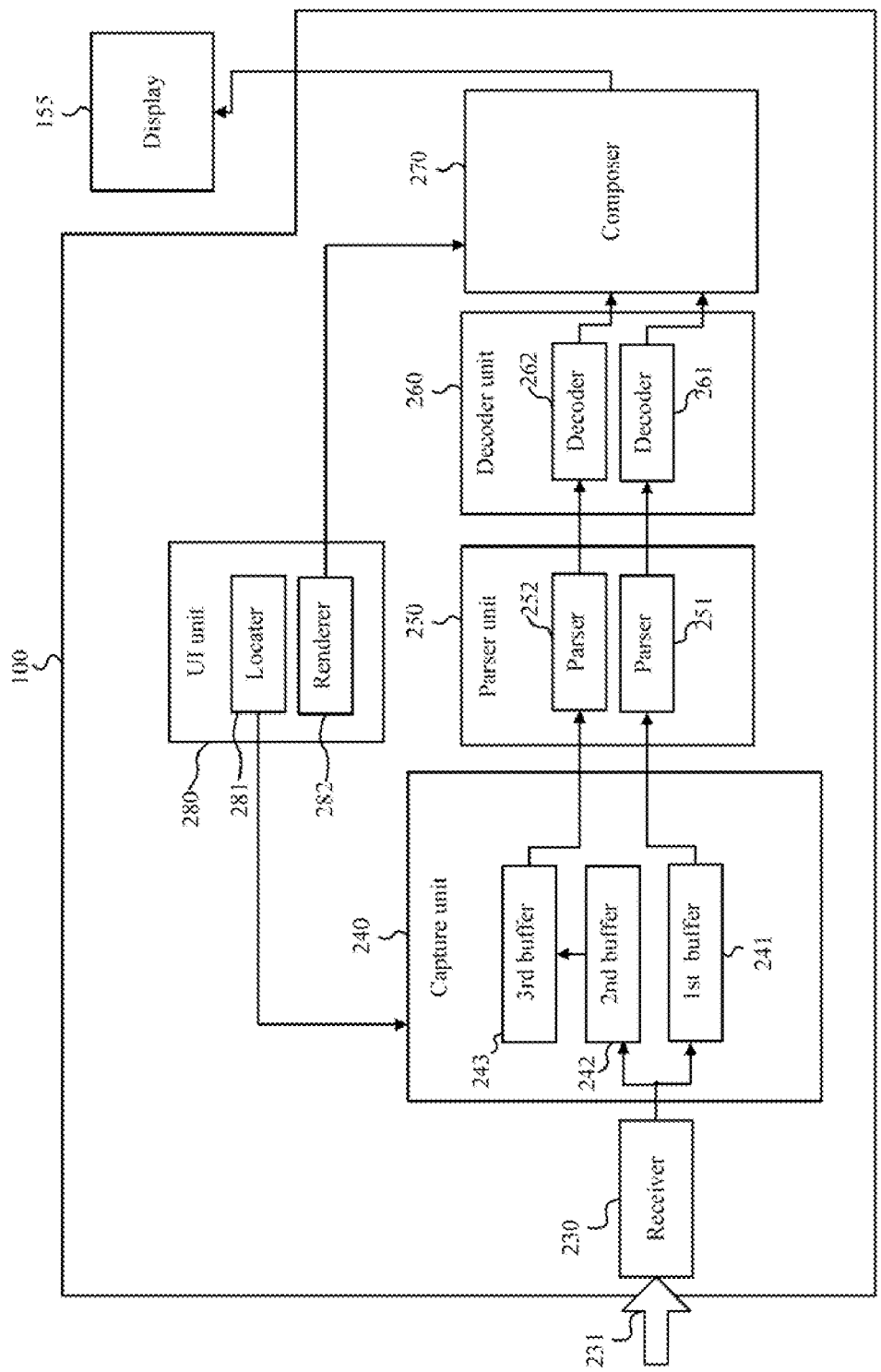
FIG. 2 is a block diagram of an exemplary embodiment of modules of the media data playback device related to media data replay functions.

FIG. 2 shows modules of the device 100 related to media data replay functions. Components 240-280 may be implemented by electric circuits, such as a portion of the DSP in the processor 151, or computer programs executable by the processor 151. The computer programs may be stored in the main memory 152, the nonvolatile memory 153, or the mass storage device 154. The device 100 comprises a buffer unit 240 with a first buffer 241, a second buffer 242, and a third buffer 243. Each of buffers 241-243 may comprise a reserved area of the main memory 152 or the nonvolatile memory 153.

A receiver 230 receives and outputs a media data stream 231 from the communication unit 156 to a capture unit 240. The media data stream 231 comprises synchronized video and audio data, which may conform to international standard ISO/IEC 13818-1 developed by International Organization for Standardization (ISO) and the International Electrotechnical Commission (IEC). The ISO/IEC 13818-1 standard published as H.222 defines formats of packetized elementary stream (PES) and transport stream (TS). For example, the media data stream 231 comprises a plurality of PESs. Each of the PESs is encapsulated into TS packets.

Figure 3:
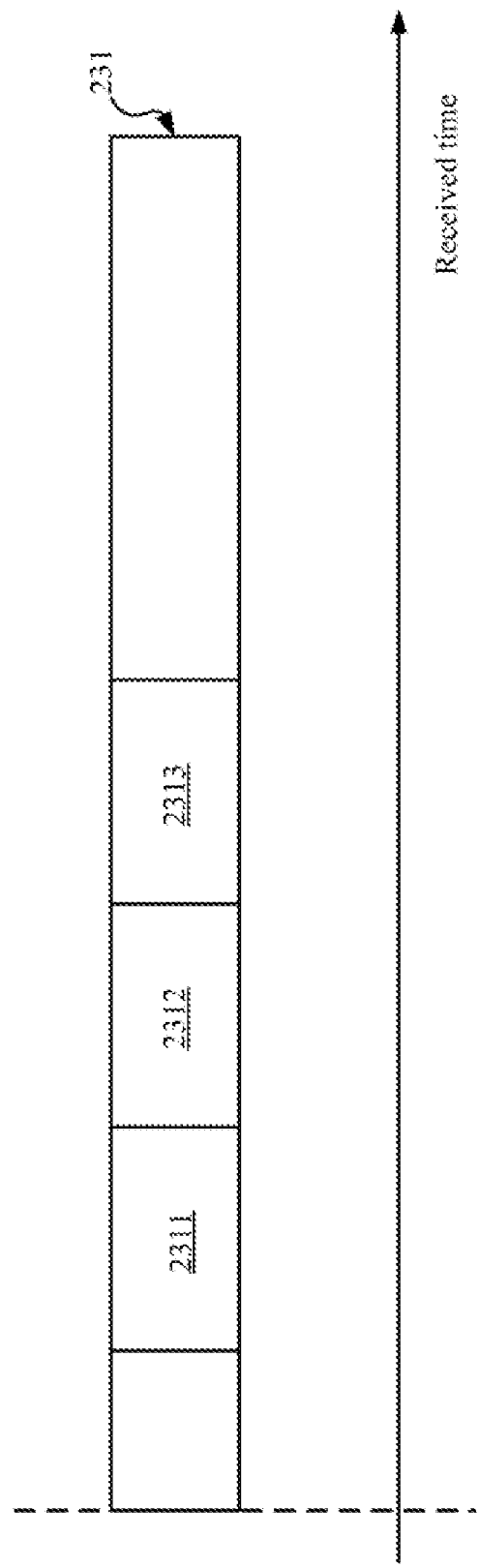
FIG. 3 is a schematic diagram showing an exemplary media data stream with respect to received time thereof by the device.
Figure 4:
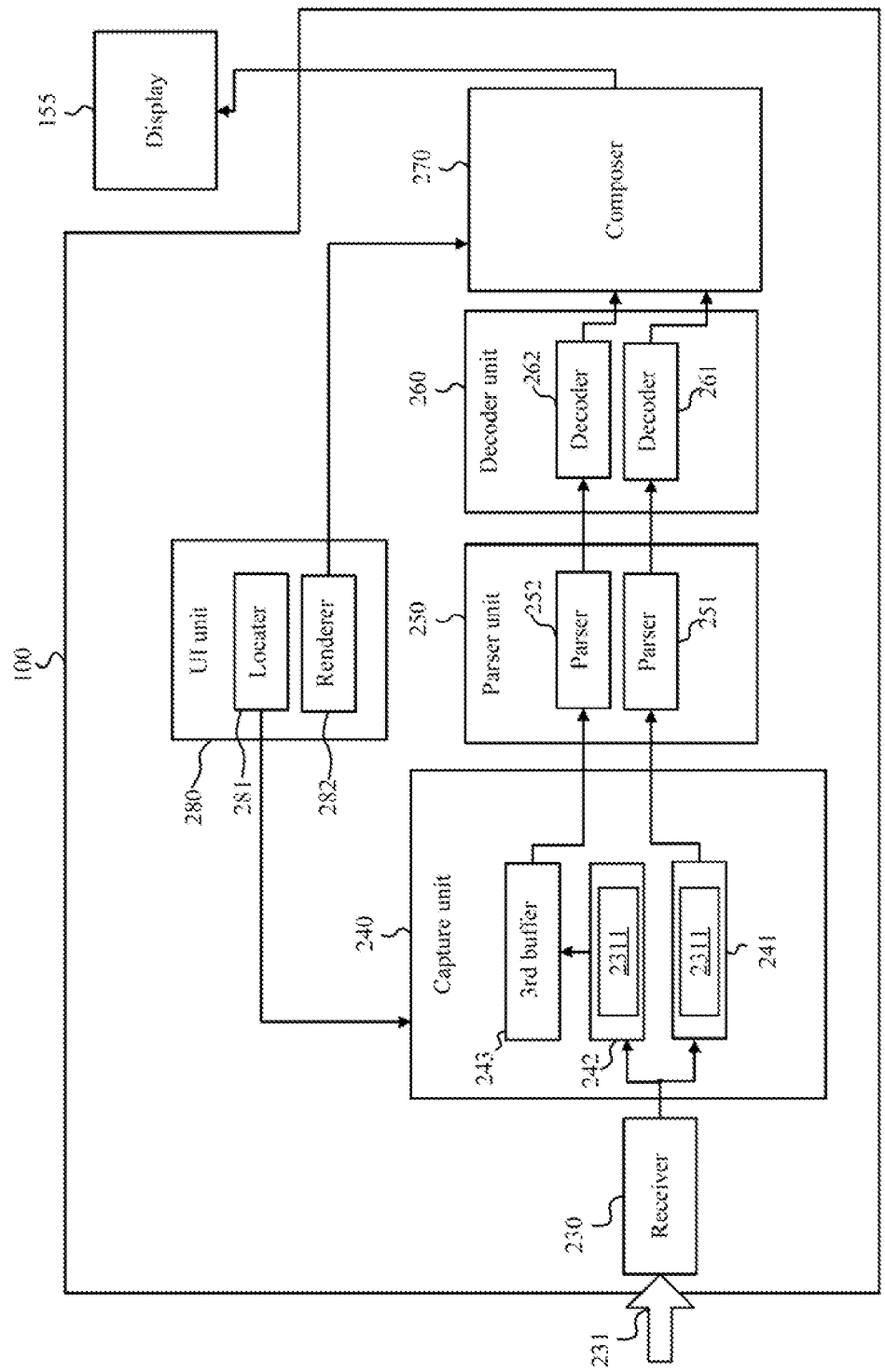
FIG. 4 is a block diagram of an exemplary embodiment of the media data playback device with duplicated video data sections.

With reference to FIGS. 3 and 4, the capture unit 240 duplicates and stores a first section 2311 of the media data stream 231 as a first copy and a second copy respectively in the first buffer 241 and the second buffer 242. The first copy of the first section 2311 in the first buffer 241 is output from the capture unit 240 to a first parser 251 for parsing. Subsequently, the parsed first copy of the first section 2311 is output from the first parser 251 to the first decoder 261 for decoding. A composer 270 composes viewable signals from the decoded first copy of the first section 2311 and displays the viewable signals in the display 155. Each of the buffers 241 and 243 comprises a pointer operable to target a media data presentation unit in the buffer, ready to be output from the capture unit 240 to the parser 250 for the parsing, decoding, and displaying processes in the parser unit 250, the decoder unit 260, and the composer unit 270. The capture unit 240 changes each of such pointers to target a media data presentation unit next to the output presentation unit and repeats the described processes. Each of the parsers 251 and 252 parses received media data, such as the first copy of the first section 2311, according to a multimedia streaming standard, such as the International telecommunication Union (ITU) standard H.222, or flash video (FLV) streaming standard. Each of the decoders 261 and 262 decodes received media data, such as the parsed first copy of the first section 2311, according to a video coding standard, such as H.264, VC-1, MPEG-2, or MPEG-4.

Figure 5:
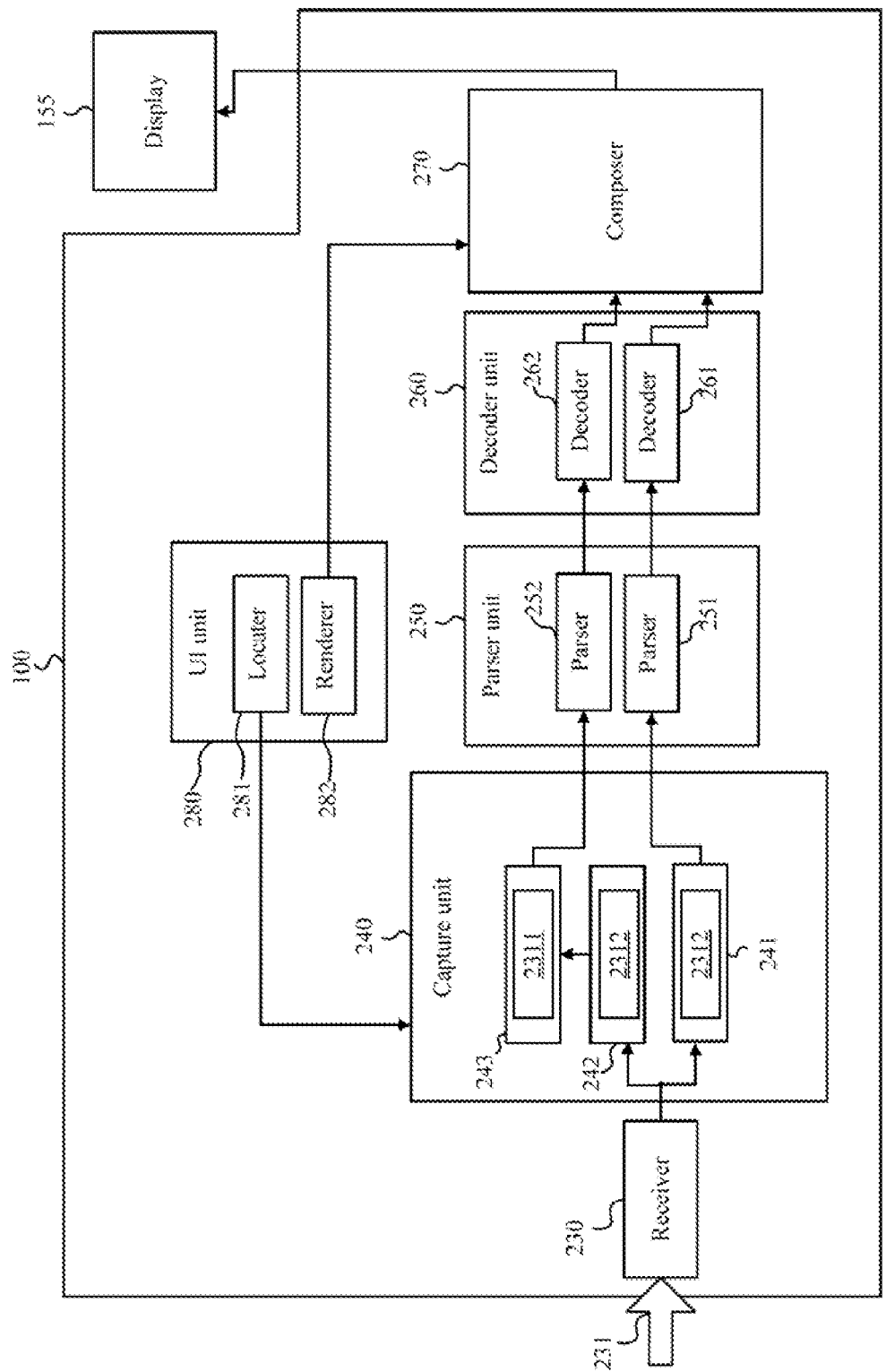
FIG. 5 is a block diagram of an exemplary embodiment of the media data playback device with buffered video data sections.

With reference to FIG. 5, when the processor 151 receives a replay command for replaying the media data stream 231, for example, from the I/O units 160 or the communication unit 156, the capture unit 240 generates and stores a third copy of the second copy of the first section 2311 in the third buffer 243 in response to the replay command. The first copy and the second copy of the section 2311 in the first buffer 241 and the second buffer 242 are replaced by a second section 2312 of the media data stream 231 following the section 2311.

The parser unit 250 simultaneously parses the third copy of the first section 2311 from the third buffer 243 utilizing a second parser 252 and parses the second section 2312 from the first buffer 241 utilizing a first parser 251.

The decoder unit 260 simultaneously decodes the parsed third copy of the first section 2311 utilizing a second decoder 262 and decodes the parsed second section 2312 utilizing a first decoder 261.

The composer 270 composes viewable signals from the decoded third copy of the first section 2311 and the second section 2312. The composer 270 may compose viewable signals of the second section 2312 in a relatively greater image and viewable signals of the decoded third copy of the first section 2311 in a relatively smaller image overlaid on the greater image. The display 155 displays the viewable signals.

2.1 Showing Replay Progress

When presenting a first presentation unit in the third copy of the first section 2311, the composer 270 displays a progress bar showing a position of the first presentation unit in the buffered third copy relative to the length of the third copy of the first section 2311. The first presentation unit may comprise a unit of PES or TS streams, such as a PES packet, a TS packet, a PES stream, or a TS stream comprising a group of related P, I, and B frames. A progress bar renderer 282 of the user interface (UI) unit 280 may compute the length of the third copy of the first section 2311 and the position of the first presentation unit relative to the length of the third copy of the first section 2311 based on program clock references (PCRs) in TS packets of the third copy of the first section 2311, presentation time-stamps (DTSs) or decoding time-stamps (DTSs) in PES packets of the third copy of the first section 2311, or a timestamp in flash video stream packets of the third copy of the first section 2311.

2.2 Progress Based on PCR

For example, the progress bar renderer 282 retrieves a first PCR value PCR1 and a last PCR value PCR2 of TS packets in the third buffer 243 and retrieves a PCR value PCRi of the first presentation unit which undergoes parsing process by the second parser 252. The progress bar renderer 282 computes the length L1 of the third copy of the first section 2311 by applying the following formula (1) and the progress P1 of the first presentation unit by applying the following formula (2):

$$L1 = PCR2 - PCR1 \quad (1)$$

$$P1 = PCRi - PCR1 \quad (2)$$

The progress bar renderer 282 computes a ratio R1 of the progress P1 of the first presentation unit to the length L1 of the third copy of the first section 2311 by applying the following formula (3):

$$R1 = P1/L1 \quad (3)$$

Figure 6:
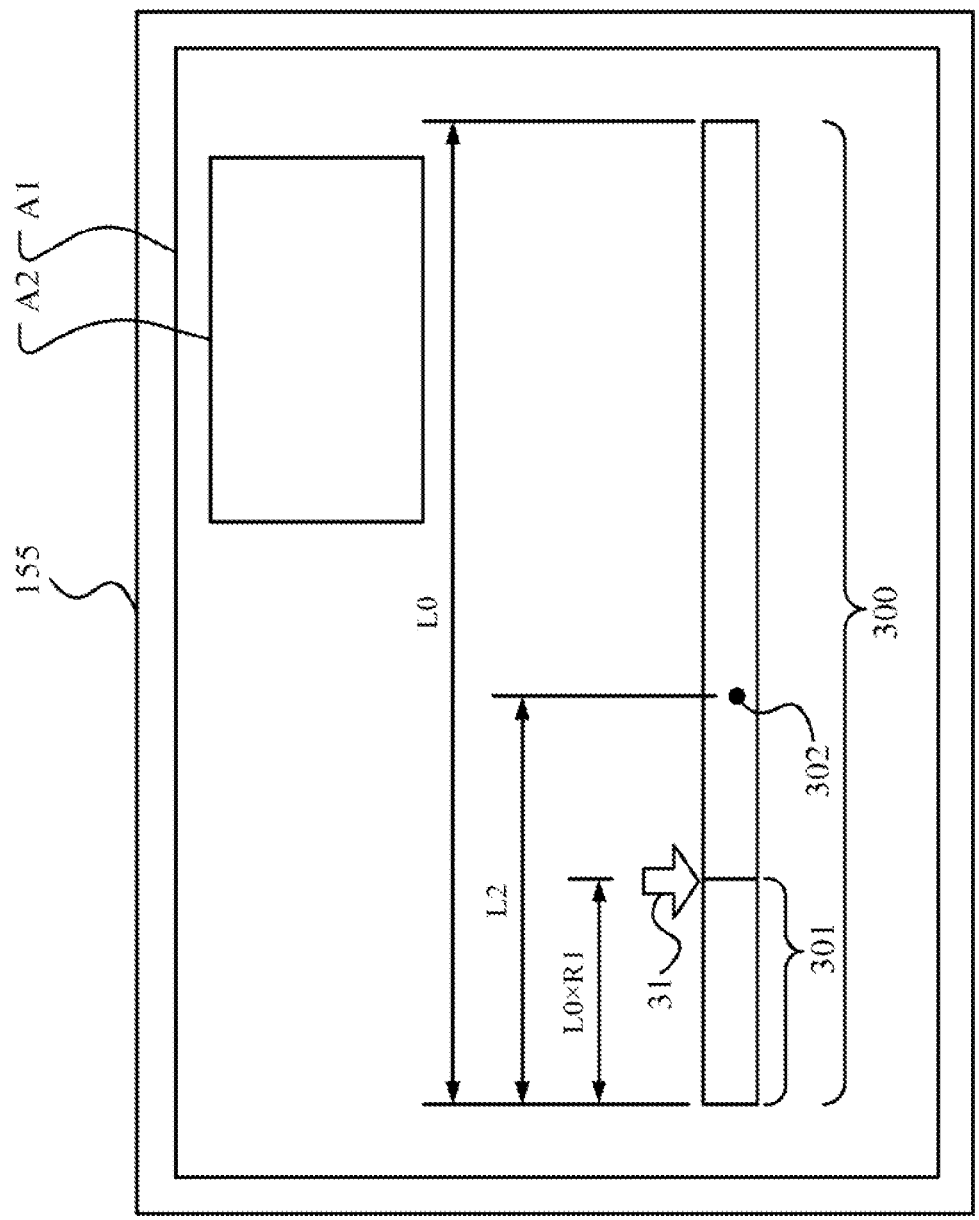
FIG. 6 is a schematic diagram showing an exemplary progress bar.

With reference to FIG. 6, the progress bar renderer 282 renders a progress bar 300 of length L0 with a segment 301 thereon of length L0×R1 indicative of the position and progress of the first presentation unit relative to the length of the third copy of the first section 2311. The left end of the segment 301 may be aligned with the left end of the rendered progress bar 300 but is not limited thereto. The progress bar renderer 282 may represent the position of the first presentation unit by other symbols, such as an icon 31. The progress bar renderer 282 outputs the rendered progress bar 300 to the composer 270. As shown in FIG. 6, the composer 270 composes viewable signals from the progress bar 300 and displays the viewable signals thereof on the display 155. The composer 270 may show the progress bar as an on screen display (OSD) overlaid on an area A1 showing video decoded from the second section 2312. An area A2 displays video decoded from the first presentation unit of the third copy of the first section 2311.

2.3 Progress Based on PTS

In an example of utilizing PTS to show replay progress, the progress bar renderer 282 retrieves a first PTS value PTS1 and a last PTS value PTS2 of PES packets in the third buffer 243 and retrieves a PTS value PTSi of the first presentation unit, which undergoes presentation by the composer 270. The progress bar renderer 282 computes the length L1' of the third copy of the first section 2311 by applying the following formula (4) and the progress P1' of the first presentation unit by applying the following formula (5):

$$L1' = PTS2 - PTS1 \quad (4)$$

$$P1' = PTSi - PTS1 \quad (5)$$

The progress bar renderer 282 computes a ratio R1' of the progress P1' of the first presentation unit to the length L1' of the third copy of the first section 2311 by applying the following formula (6):

$$R1' = P1'/L1' \quad (6)$$

The progress bar renderer 282 renders a progress bar of length L0 with an segment thereon of length L0×R1' indicative of the position and progress of the first presentation unit relative to the length of the third copy of the first section 2311. The progress bar renderer 282 outputs the rendered progress bar to the composer 270. The composer 270 composes viewable signals from the progress bar and displays the viewable signals thereof on the display 155.

2.4 Progress Based on DTS

In an example of utilizing DTS to show replay progress, the progress bar renderer 282 retrieves a first DTS value DTS 1 and a last DTS value DTS2 of PES packets in the third buffer 243 and retrieves a DTS value DTSi of the first presentation unit which undergoes decoding process by the second decoder 262. The progress bar renderer 282 computes the length L1" of the third copy of the first section 2311 by applying the following formula (7) and the progress P1" of the first presentation unit by applying the following formula (8):

$$L1'' = DTS2 - DTS1 \quad (7)$$

$$P1'' = DTSi - DTS1 \quad (8)$$

The progress bar renderer 282 computes a ratio R1" of the progress P1" of the first presentation unit to the length L1" of the third copy of the first section 2311 by applying the following formula (9):

$$R1'' = P1''/L1'' \quad (9)$$

The progress bar renderer 282 renders a progress bar of length L0 with an segment thereon of length L0×R1" indicative of the position and progress of the first presentation unit relative to the length of the third copy of the first section 2311. The progress bar renderer 282 outputs the rendered progress bar to the composer 270. The composer 270 composes viewable signals from the progress bar and displays the viewable signals thereof on the display 155.

2.5 Locating Presentation Unit

Figure 7:
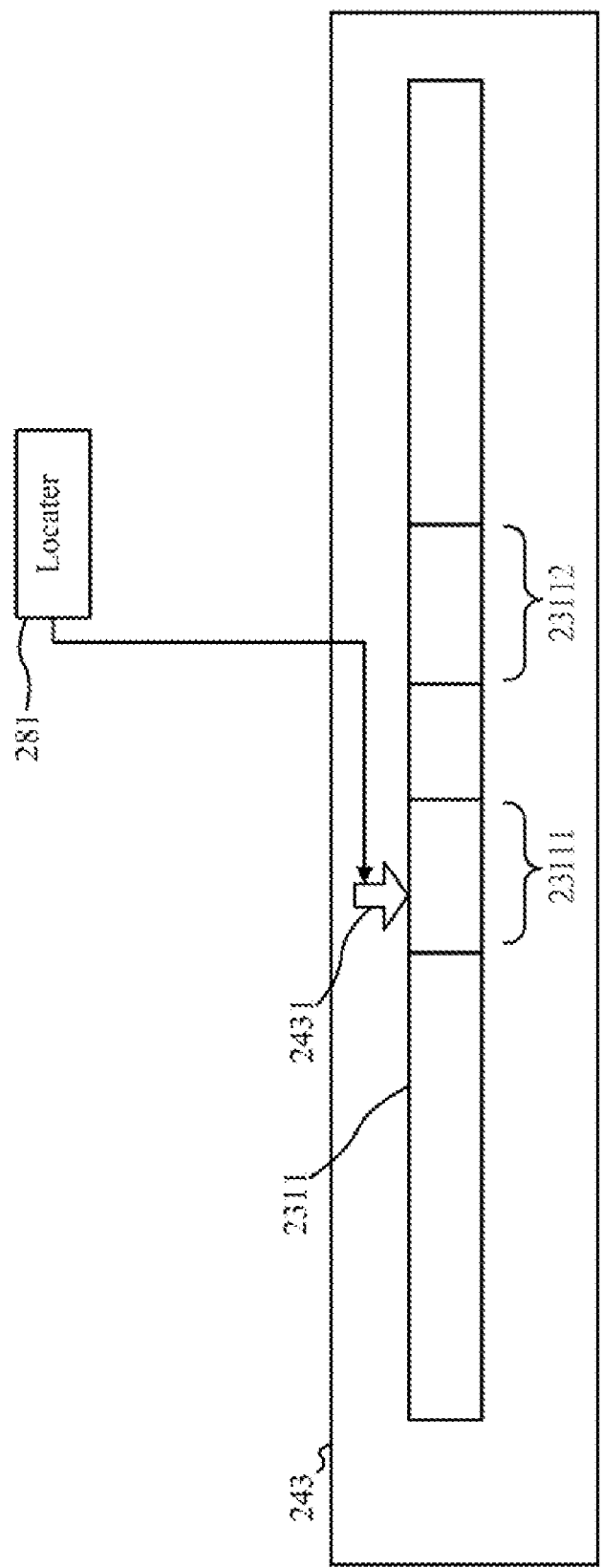
FIG. 7 is a schematic diagram showing an exemplary embodiment of a buffered media data locater and a buffer.
Figure 8:
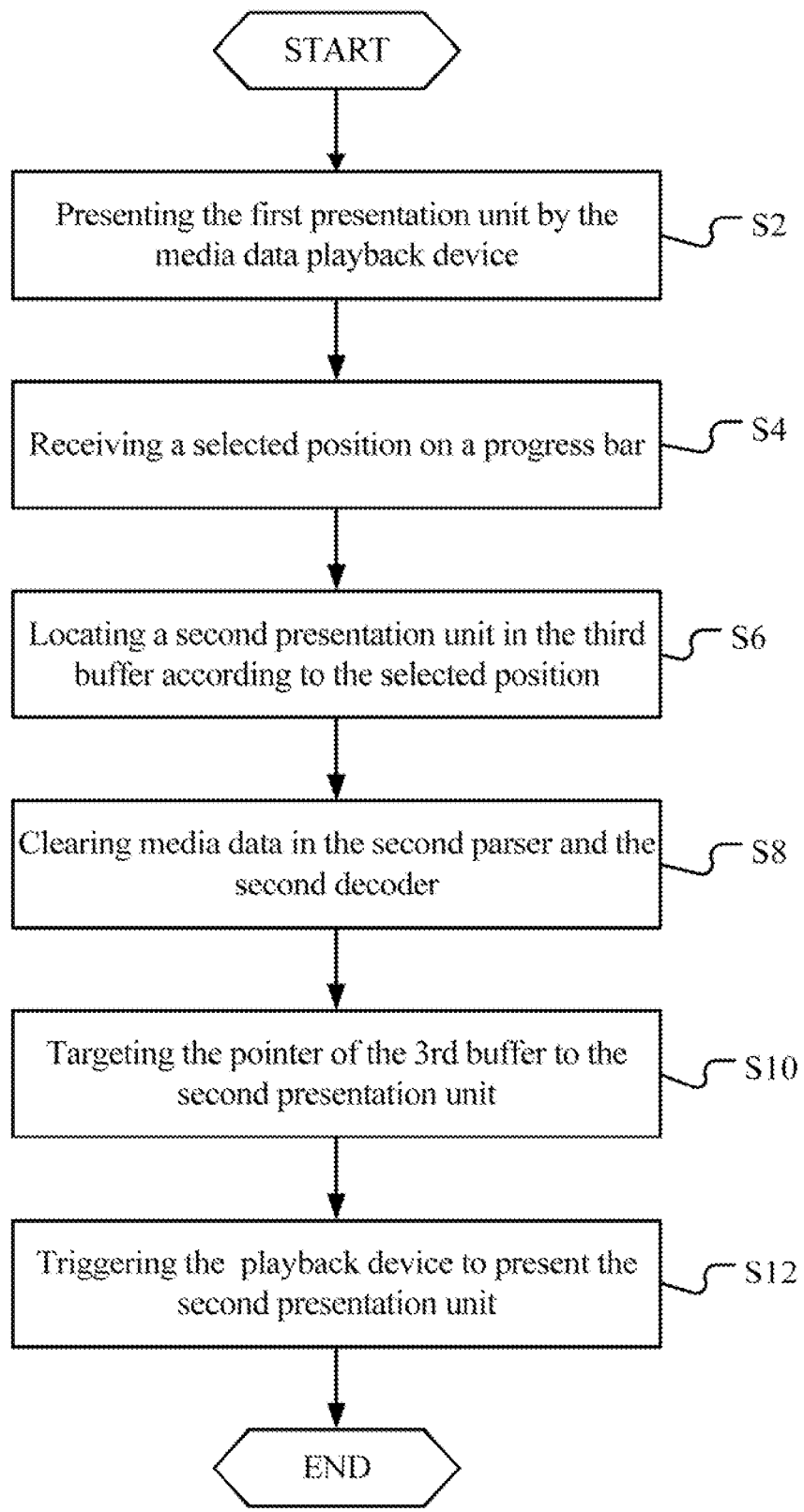
FIG. 8 is a flowchart showing exemplary random access operations of the buffered media data.
Figure 9:
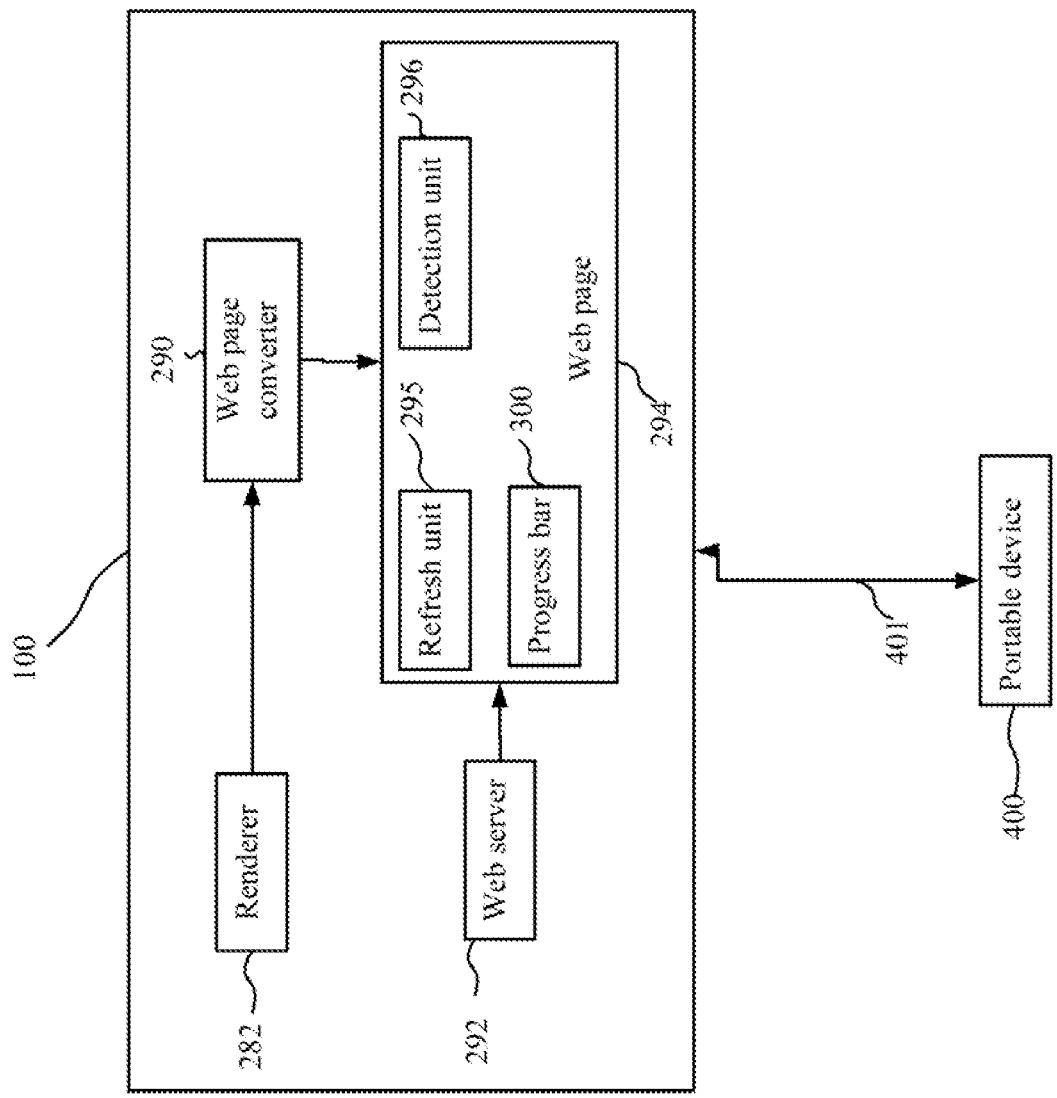
FIG. 9 is a schematic diagram showing an exemplary embodiment of a user interface converter.

With reference to FIGS. 7, 8, and 9, a pointer 2431 for the third buffer 243 targets a first presentation unit 23111 of the third copy of the first section 2311 of the media data stream 231. During presentation of the first presentation unit 23111 by the device 100 (step S2), a locater 281 in the UI unit 280 receives input signals from the I/O units 160 indicative of a selected position, such as a position 302 in FIG. 6, on the progress bar 300 (step S4). In response to the received input signals, the locater 281 locates a second presentation unit 23112 in the third copy of the first section 2311 according to the selected position (step S6), issues a flush command to the second parser 252 and the second decoder 262 to clear media data therein (step S8), and changes the pointer 2431 to target the second presentation unit 23112 (step S10), thus triggering the device 100 to present the second presentation unit 23112 (step S12). In response to step S8, the capture unit 240 outputs the second presentation unit 23112 to the second parser 252 for parsing, the parsed second presentation unit 23112 is output from the second parser 252 to the second decoder 262 for decoding, and the composer 270 composes viewable signals from the decoded second presentation unit 23112 and displays the viewable signals on the display 155.

Location of the second presentation unit 23112 in step S6 is detailed in the following. For example, the locater 281 calculates the distance from the left end of the progress bar 300 to the position 302 as L2, and a ratio R2 of the distance L2 to the length L0 of the progress bar 300 as R2=L2/L0. If capacity of the third buffer 243 is J bytes with initial address K0, for example, the locater 281 locates a target address K1, wherein:

$$K1 = K0 + J \times R2 \tag{10}$$

The locater 281 locates and targets the pointer 2431 to the target address K1. As the third buffer 243 in the capture unit 240 continuously outputs media data to the second parser 252 according to the target addresses indicated by the pointer of the third buffer 243 after the flush command, the second parser 252 discards data until receiving a complete PES packet and resumes parsing PES packets, and the second decoder 262 discards data until receiving an intraframe (I frame) and resumes decoding I frames, predicted frames (known as P frames), and bi-directional predictive frames (known as B frames) related to the I frames.

2.6 Clipping Replay Media

The device 100 plays entirety of the third copy of the first section 2311 in the third buffer 243 in response to a replay command. When receiving two selected positions on the progress bar 300 as delimiting points, the locater 281 locates two presentation units in the third copy of the first section 2311 corresponding to the two selected positions, and directs the device 100 to play a portion of the third copy of the first section 2311 delimited by the two located presentation units in response to a subsequent replay command The two delimiting presentation units may be referred to as bookmarks.

The I/O units 160 generate signals indicative of the two selected positions on the progress bar 300. For example, the sensor 167 may simultaneously detect two contact points input by a user on the display 155. When detecting two contact points simultaneously moving on and leaving the progress bar 300, the sensor 167 interprets the two positions where the contact points leave the progress bar 300 as two selected positions on the progress bar 300.

2.7 Platform Independent UI

With reference to FIG. 9, the device 100 further comprises a user interface (UI) converter 290 operable to convert the progress bar generated by the renderer 282 into an operating system (OS) independent and browser independent UI, such as a webpage 294 or a widget, and integrate a refresh unit 295 and a detection unit 296 to the platform independent UI. For example, when a portable device 400 connects and issues a hypertext transfer protocol (HTTP) request to the Internet protocol (IP) address of the device 100, a web server 292 in the device 100 responds to the HTTP request by sending the webpage 294 to the portable device 400. As the portable device 400 receives and displays the webpage 294 from the device 100, the refresh unit 295 periodically issues HTTP requests to the web server 292 for the progress bar 300 which is updated by the renderer 282. The web server 292 in the device 100 responds to the periodically issued HTTP request by sending the updated progress bar 300 to the portable device 400. The portable device 400 displays the updated progress bar 300 in the displayed webpage 294.

The portable device 400 may comprise input devices, such as a touch screen, operable to detect selected points on the progress bar 300. The detection unit 296 received by the portable device 400 detects one or more selected points on the updated progress bar 300 and sends the one or more selected points to the device 100 by issuing HTTP requests carrying data representative of the one or more selected points to the web server 292. The web server 292 receives and transfers the HTTP requests carrying data representative of the one or more selected points to the locater 281. The device 100 may respond to the one or more selected points on the updated progress bar 300 as previously described.

The components 290, 292, 295, and 296 of the device 100 in FIG. 9 may comprise computer programs. The components 295, and 296 may comprise JavaScript language. The HTTP requests may comprise XMLHttpRequest (XHR) or really simple syndication (RSS) refresh requests. The XHR is utilized in asynchronous JavaScript and XML (AJAX) technologies.

3. Replay Position Switching

The device 100 may execute positioning methods disclosed in U.S. patent application Ser. No. 12/543,588 entitled "AUDIO PLAYBACK POSITIONING METHOD AND ELECTROINC SYSTEM UTILIZING THE SAME" to locate the one or more selected points or positions on the progress bar 300. Exemplary embodiments of utilizing positioning method are described in the following.

Figure 10:
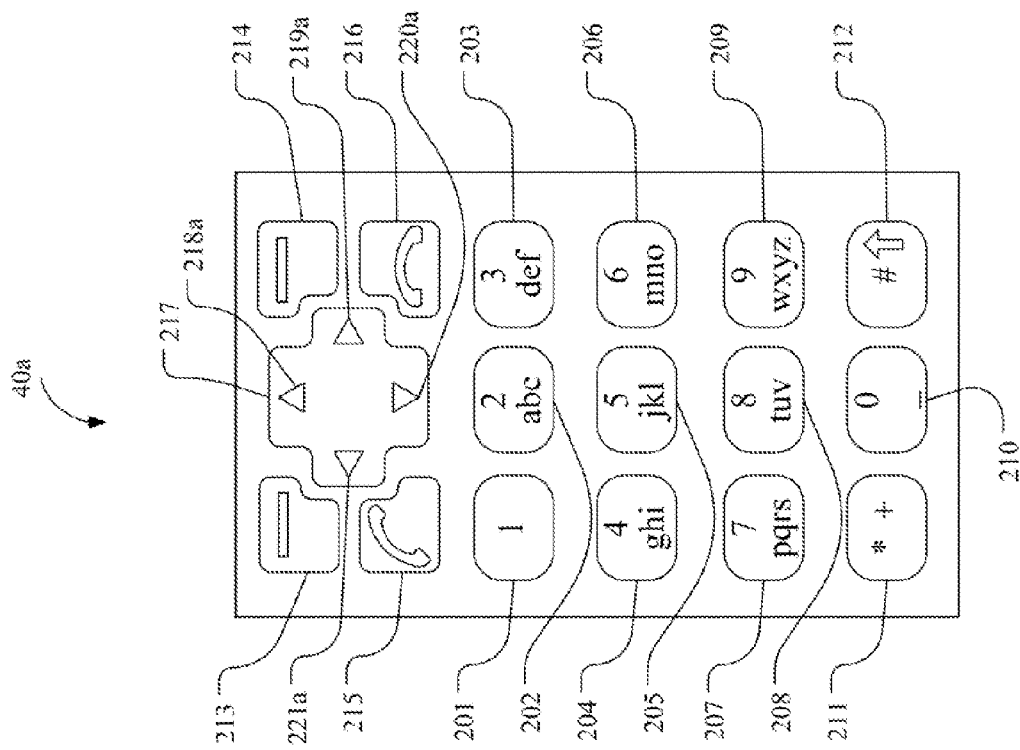
FIG. 10 is a schematic diagram showing an exemplary embodiment of a keypad.

A keyboard 40a in FIG. 10 may comprise an exemplary embodiment of the I/O units 160 or an input device of the portable device 400. The keyboard 40a may be made of mechanical structures or comprise a virtual keyboard shown on the display 155. The keyboard comprises keys 201-217. Keys 213 and 214 are function keys for triggering functions based on software programs executed by the device 100. The key 216 is an on-hook key operable to trigger a telephone call. The key 215 is an off-hook key operable to terminate telephone calls. The key 217 is operable to direct direction and movement of a cursor on the display 155. Activation of points 218a, 219a, 220a, and 221a respectively trigger movement of a cursor or an icon in up, right, down, and left directions. Digits, letters, and/or symbols corresponding to the keys 201-212 are shown on respective keys in FIG. 2, but are not intended to be limited thereto. The device 100 may receive digits or symbols transmitted by the portable device 400 through the wireless communication channel 401. For example, the detection unit 296 received by the portable device 400 detects input digits from the portable device 400 and sends the digits to the device 100 by issuing HTTP requests carrying data representative of the digits to the web server 292. The web server 292 receives and transfers the HTTP requests carrying the data representative of the digits to the locater 281. The device 100 may respond to the digits as described in the following embodiments of the positioning method.

An object to which the positioning method is applied is referred to as a target object. A division of the target object is referred to as a segment. A selected point in a target object may comprise a predetermined position thereof, such as a beginning, an end, or a mid position of a located segment. The length of a target object is assumed as a constant D in the following description. When the processor 151 applies the positioning method to the section 2311 of media data 231, the total length thereof may be represented by memory size or data size in bytes, or total playback time of the section 2311 of media data 231 measured in time units, such as minutes or seconds. The total playback time is a period counted from the beginning to the end of playing the section 2311 of media data 231. A title may comprise a media data stream or a section thereof.

The I/O unit 160 may input digits to the device 100 for various functions. For example, the I/O unit 160 may input digits to the device 100 as a phone number for calling or message transmission, or a number for tuning a tuner to a channel to receive broadcast signals. In the following description, digits received by the device 100 are utilized as indices to locate positions in a target object, such as the progress bar 300 or the section 2311. The device 100 determines a corresponding function for the digits received from numeric keys or other input devices. The method for positioning playback of the section 2311 may be implemented by computer programs executed in the device 100 or the portable device 400. Digits received in the following embodiments of the positioning method may be generated from depression of numeric keys of the I/O units 160 or the portable device 400, or through recognition of contact operations received from the I/O units 160 or a touch sensitive device of the portable device 400.

3.1 Positioning Method

Figure 11:
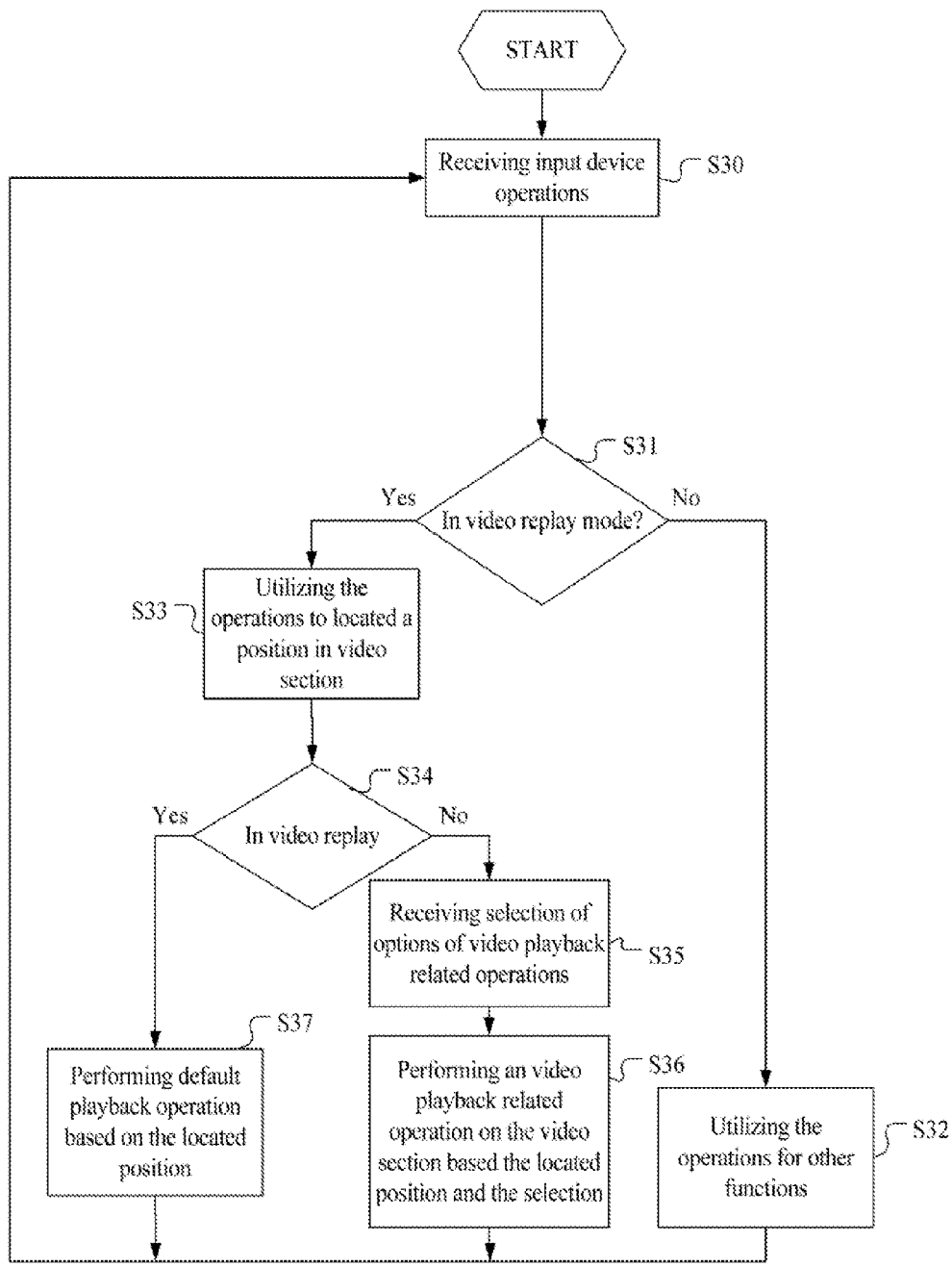
FIGS. 11-12 are flowcharts showing embodiments of a media data playback positioning method.

With reference to FIG. 11, when receiving digits from the I/O unit 160 (step S30), the processor 151 determines if the device 100 is in a video replay mode (step S31). If the device 100 is not in the video replay mode, the processor 151 utilizes the received digits for functions irrelevant to mode, such as converting the received digits into phone numbers or channel numbers (step S32). If the device 100 is in the video replay mode, the processor 151 utilizes the received digits to position progress bar and video section (step S33). The device 100 in the video replay mode may, for example, show video replay GUIs on the display 155 for replaying at least one video section in the third buffer 243. After locating a position or a segment in the video section in the step S33, the processor 151 determines if the device 100 is replaying a video section, such as the section 2311 (step S34). When the device 100 is replaying a video section, the processor 151 directly applies a default operation to the video section based on the located position or segment, such as switching video playback to the located position or video segment (step S37). If the device 100 is not replaying any video section, the processor 151 receives a selected playback operation option (step S35) and applies the selected operation to the video section in the third buffer 243 based on the located position or video segment (step S36). For example, the operations in steps S35-S37 may comprise video replay, fast forwarding or rewinding operations, or bookmark setting. The operations may be triggered by a selection of options displayed on the display 155 or by operation of corresponding keys of the I/O unit 160.

Embodiments of video playback positioning in the step S33 is detailed in the following paragraphs. The device 100 utilizes a timer to keep an extensible period of time, during which the processor 151 may receive more digits to more precisely locate a position or a segment in the video section 2311. When the processor 151 is playing the section 2311 at a current position thereof, a forward skipping operation triggers the playing of the section 2311 to be switched to a first target position posterior to the current position in the section 2311 with respect to playback time, and a backward skipping operation triggers the playing of the section 2311 to be switched to a second target position prior to the current position in the section 2311 with respect to playback time. Note that a segment of a target object may represent a constituent portion of the target object or a sub-segment of such constituent portion. A sub-segment of a segment is a constituent segment thereof of relatively smaller size.

An exemplary embodiment of the positioning method interpreting the section 2311 as comprising an arbitrary number of video segments is detailed as follows.

3.2 First Exemplary Embodiment of the Positioning Method

Figure 12:
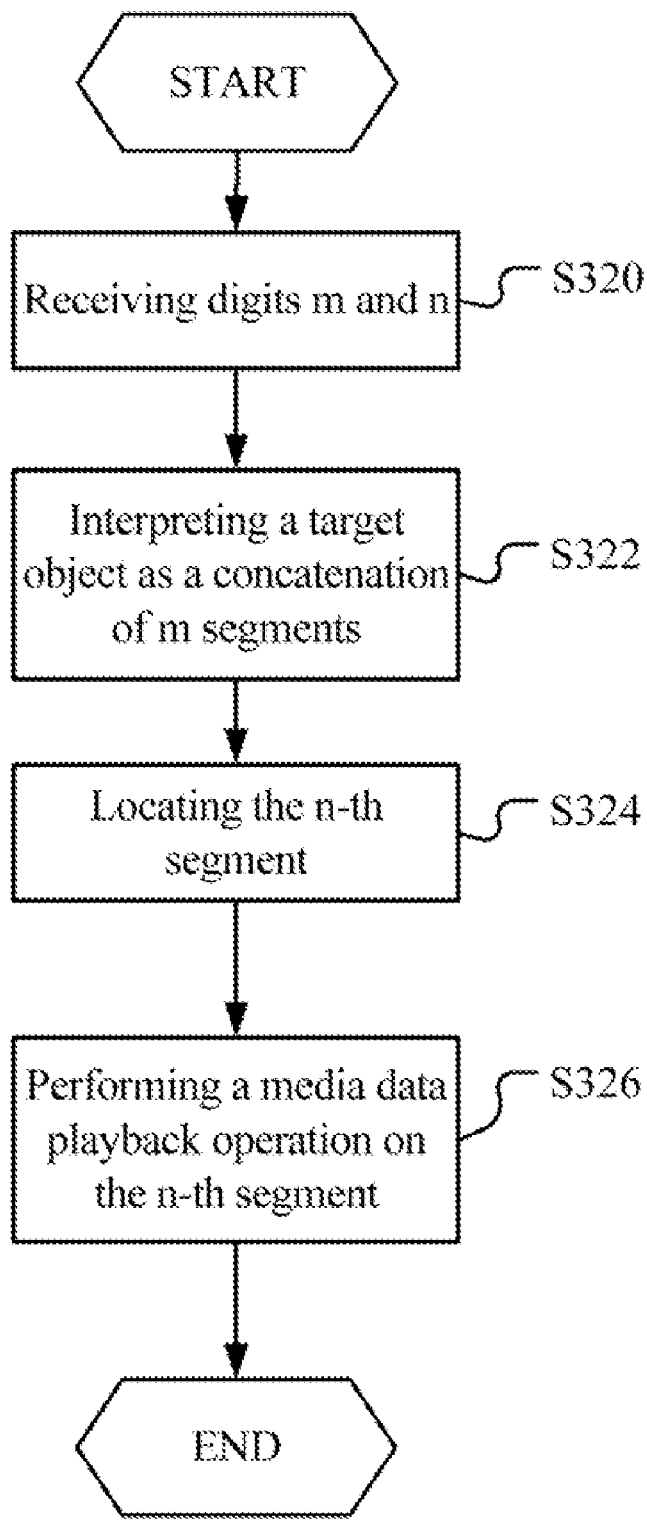

With reference to FIG. 12, the device 100 executes the first exemplary embodiment of the positioning method to an active GUI element shown on the display 155. The following example is provided assuming the progress bar 300 of the section 2311 is the active GUI element. The progress bar 300 is representative of the section 2311, so that directly applying the method to the section 2311 to locate a target position or a target segment thereon, the processor 151 may accordingly locate a corresponding target position or segment on the progress bar 300. Operations applied on a representative of a target object, such as the progress bar 300, during execution of the positioning method correspond to operations applied to the target object, such as the section 2311. Alternatively, the processor 151 may apply the method to the progress bar 300 to locate a target position or a target segment on the progress bar and accordingly locate a corresponding target position or segment of the section 2311. The processor 151 may apply the method to the section 2311 and the progress bar thereof in parallel, for example, through synchronously executed threads or processes.

Figure 13:
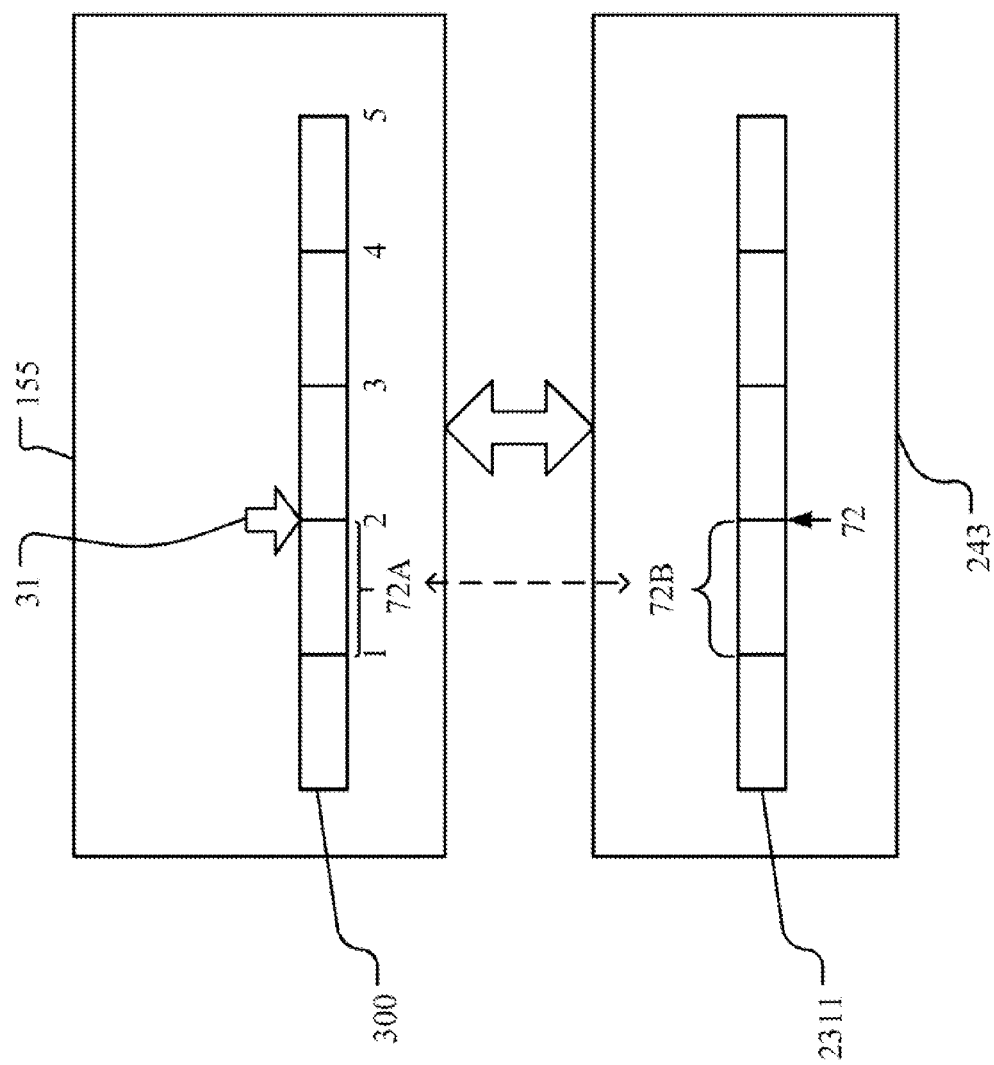
FIGS. 13-15 are schematic diagrams showing exemplary operations of a first embodiment of the positioning method.

The processor 151 receives a first digit m and a second digit n from the I/O unit 160 (step S320) and interprets target object (e.g., the section 2311) as being a concatenation of m constituent segments in response to the digit m (step S322). Each segment has length D/m. With reference to FIG. 13, if m=5 and n=2, the processor 151 interprets the progress bar 300 as being a concatenation of 5 constituent segments, wherein the first digit m specifies the number of the constituent segments in the progress bar 300. Accordingly, the processor 151 interprets the section 2311 as being a concatenation of 5 constituent segments, wherein the first digit m specifies the number of the constituent segments in the section 2311. The processor 151 may divide the length D of the section 2311 by 5, the first digit, utilize the D/5 as new unit of playback skipping operations, and obtain addresses corresponding to playback time 0, D/5, 2D/5, 3D/5, 4D/5, and 5D/5 that delimit the five segments, each having length D/5

The processor 151 locates the n-th segment in the m segments in response to the second digit n (step S324). With reference to FIG. 13, if m=5 and n=2, the processor 151 locates the $2^{nd}$ segment 72A in the progress bar 300 and the $2^{nd}$ segment 72B in the section 2311, and displays an icon 31 to indicate the end of the segment 72A corresponding to the end of the segment 72B. Thus, the second digit specifies the segment to be located.

The processor 151 performs a playback operation on the located n-th segment (step S326). As shown in FIG. 13, in the step S326, the processor 151 may, for example, begin playing the section 2311 from an end position 72 of the located segment, and the icon 31 indicates a position on the progress bar 300 corresponding to the position 72. The processor 151 may alternatively begin playing the section 2311 from a mid position of the located segment.

Figure 14:
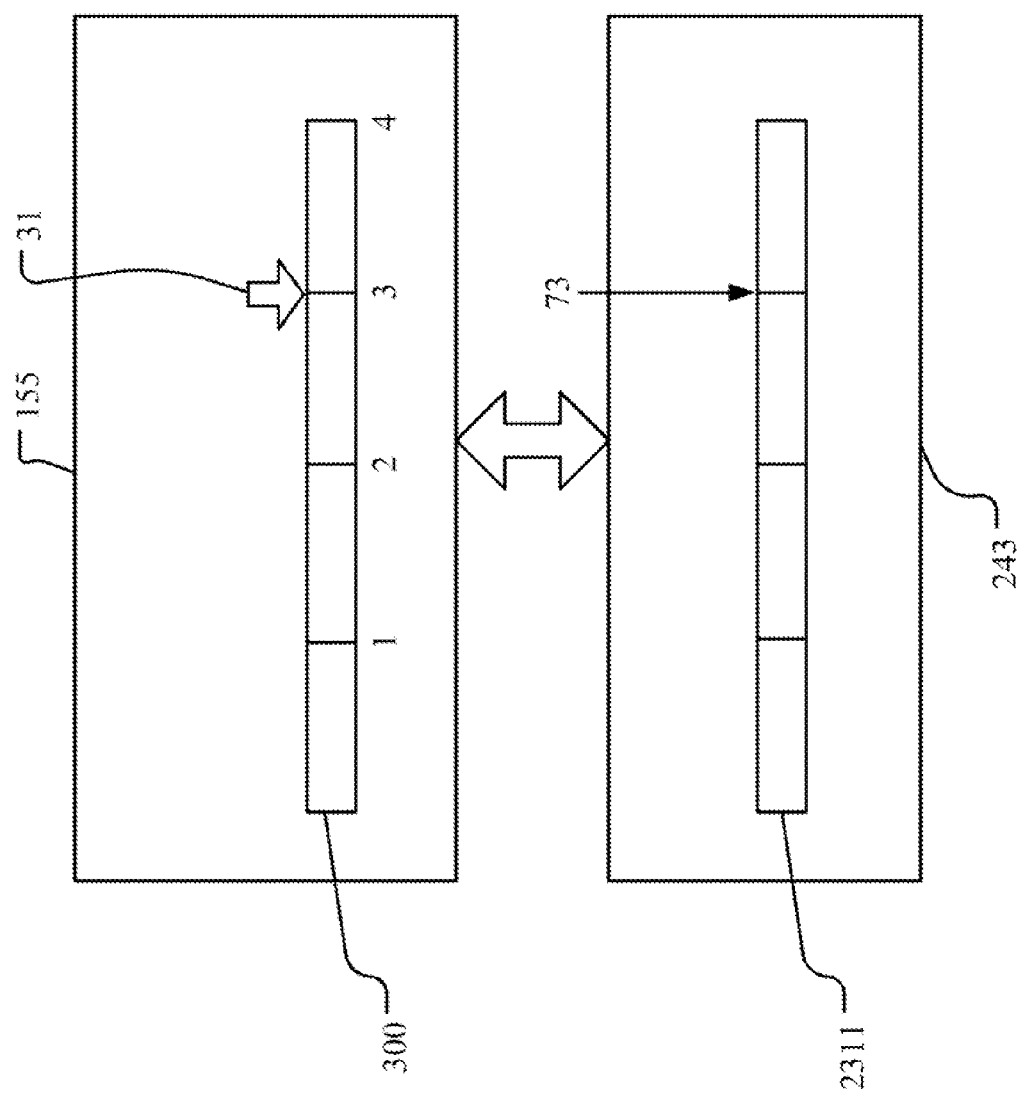

After the step S326, when receiving another set of digits, the processor 151 may repeat steps S320-S326 in the FIG. 12 for the set of digits. With reference to FIG. 14, if m=4 and n=3, the processor 151 interprets the section 2311 as being a concatenation of 4 video segments and the progress bar 300 as being a concatenation of 4 progress bar segments, and locates the $3^{rd}$ video segment in the section 2311 and the $3^{rd}$ progress bar segment in the progress bar 300. The processor 151 may also differentiate, by color, the $1^{st}$ to $3^{rd}$ progress bar segments from the $4^{th}$ progress bar segment.

A video segment corresponding to the progress bar segment indicated by the icon 31 is referred to as a selected video segment. The processor 151 may move the icon to the segment right or left of the located segment in response to operations of a direction key or a touch panel, and thus selecting instead a segment adjacent to the located segment. A selected segment in a different target object may be similarly changed in response to operations of the I/O unit 160. During video playback, changing assignment of a selected segment from an originally selected segment to a right adjacent segment thereof, such as by activation of point 219a, for example, is equivalent to a forward skipping operation. Changing assignment of a selected segment from an originally selected segment to a left adjacent segment thereof, such as by activation of point 221a, for example, is equivalent to a backward skipping operation. The processor 151 may utilize the first embodiment of the positioning method to change the basic unit of forward or backward skipping.

In the example of FIG. 13, when the $2^{nd}$ segment 72B serves as the selected segment, the processor 151 may treat the segment 72B as a new target object and further interpret the segment 72B as being a concatenation of m constituent sub-segments, each having length $D/m^2$. For example, in reiteration of the step S322 for further interpretation, the processor 151 divides the length D/5 of the segment 72B by 5, utilizes the quotient thereof as a new unit of playback skipping, and obtain addresses corresponding to playback times listed in the following to delimit sub-segments:

$$\left(\frac{D}{5}+0\right), \left(\frac{D}{5}+\frac{D}{5\times5}\right), \left(\frac{D}{5}+\frac{2D}{5\times5}\right),$$
$$\left(\frac{D}{5}+\frac{3D}{5\times5}\right), \left(\frac{D}{5}+\frac{4D}{5\times5}\right), \text{ and } \left(\frac{D}{5}+\frac{5D}{5\times5}\right)$$

Figure 15:
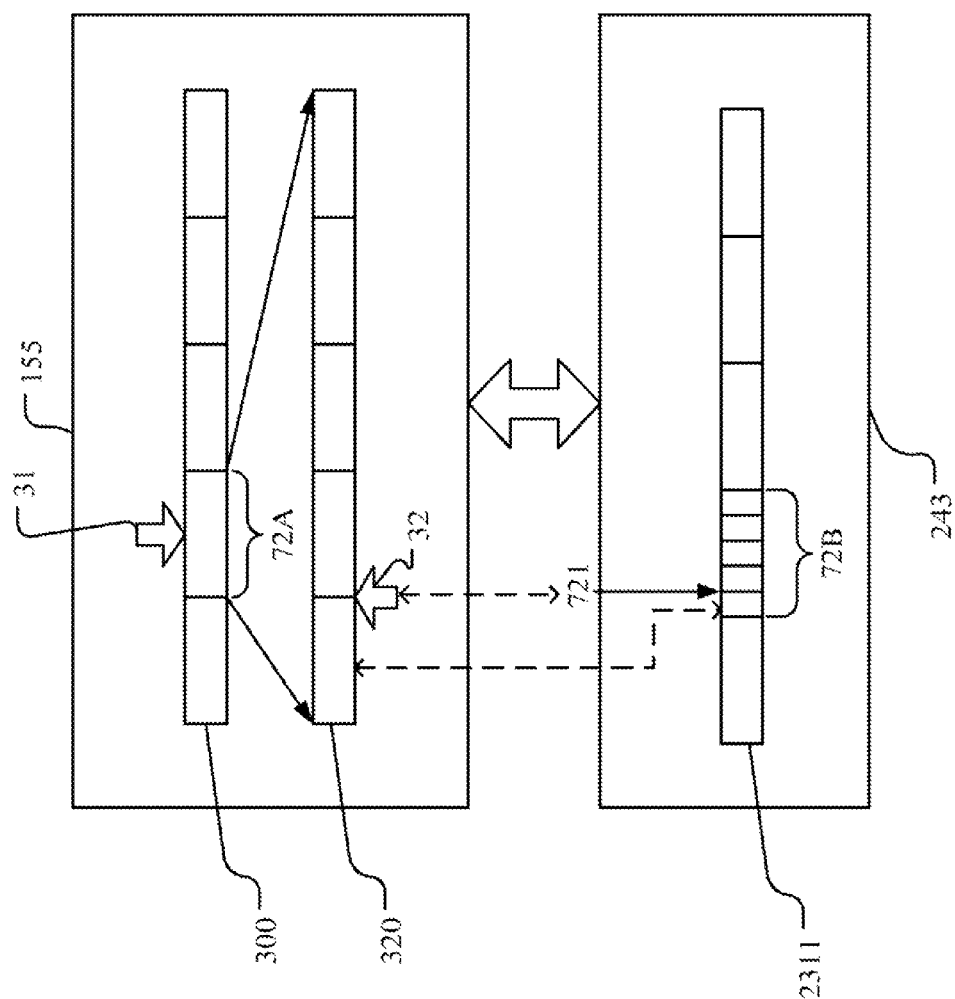

As shown in FIG. 15, a progress bar 320 represents the progress bar segment 72A and the video segment 72B. The processor 151 further interprets the progress bar segment 72A as being a concatenation of five progress bar sub-segments and the video segment 72B as a concatenation of five video sub-segments. Five segments in the progress bar 320 represent the five video sub-segments in the segment 72B. A sub-segment indicated by an icon 32 in the FIG. 15 is referred to as a selected sub-segment, wherein the icon 32 corresponds to a position 721 in the video segment 72B. Similarly, an input device, such as the key 217, may be utilized to move the icon 32, thus changing the assignment of a selected sub-segment.

A device without numeric keys may utilize a direction key, a forward skipping key, or a backward skipping key to select a segment and/or a sub-segment in a target object.

3.3 Second Exemplary Embodiment of the Positioning Method

Figure 16:
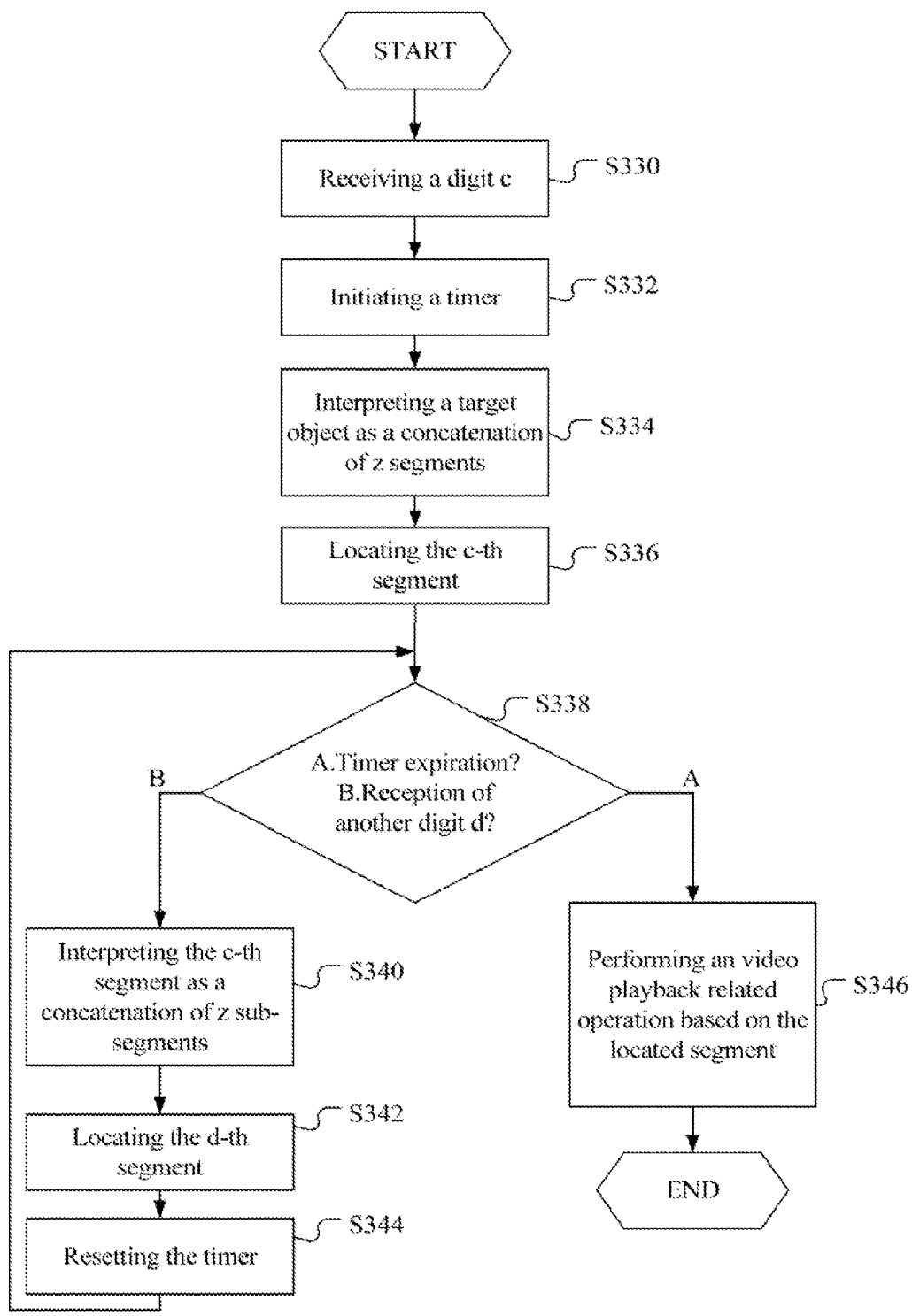
FIG. 16 is a flowchart showing a second embodiment of the media data playback positioning method.

FIG. 16 shows a second embodiment of the positioning method executed by the device 100. The memory 152 may store a predetermined number z specifying the number of segments to be interpreted as comprising the section 2311, wherein the number z is a positive integer greater than one.

Figure 17:
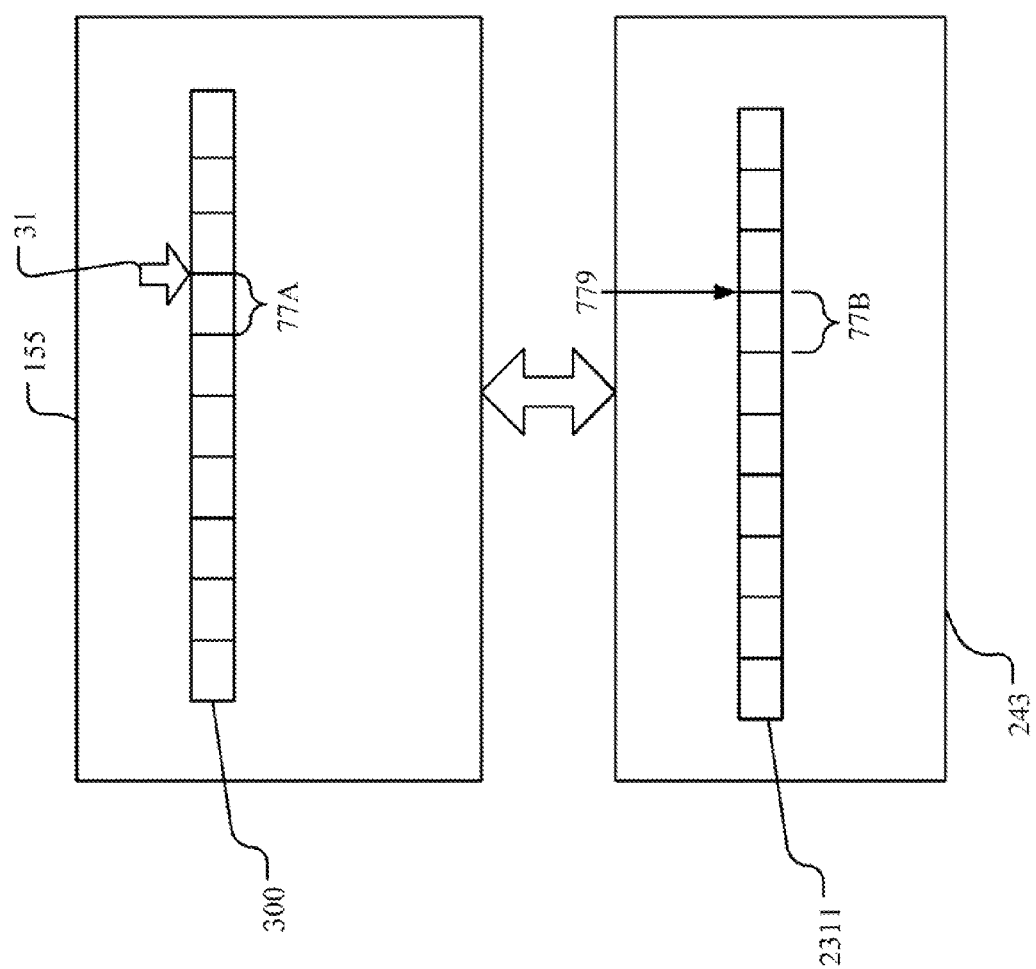
FIGS. 17-18 are schematic diagrams showing exemplary operations of the second embodiment of the media data playback positioning method.

The processor 151 receives a digit c from the I/O unit 160 (step S330) and initiates the timer 50 to keep a predetermined period of time (step S332). The processor 151 interprets the target object as being a concatenation of z constituent segments (step S334) and locates the c-th segment thereof in response to the received digit c (step S336), wherein length of each segment is D/z. The processor 151 divides the length D of the section 2311 by z, and utilizes D/z as a new unit of playback skipping operations. As shown in FIG. 17, for example, if z=10 and c=7, the processor 151 interprets the progress bar 300 as ten video segments each with length L0/10, divides the progress bar 300 into ten progress bar segments, and locates video segment 77B and progress bar segment 77A corresponding thereto in response to the digit c, wherein the icon 31 indicates an end position of the progress bar segment 77A. The processor 151 then accordingly performs corresponding operations on the section 2311 in response to the processing of the progress bar 300. Specifically, the processor 151 interprets the section 2311 as ten video segments each a tenth of the length of the section 2311, and locates video segment 77B corresponding to the progress bar segment 77A. A position 779 corresponds to a position indicated by the icon 31.

The processor 151 determines if the timer 50 expires (event A), and if another digit d is received from the I/O unit 160 before the timer 50 expires (event B) (step S338).

Figure 18:
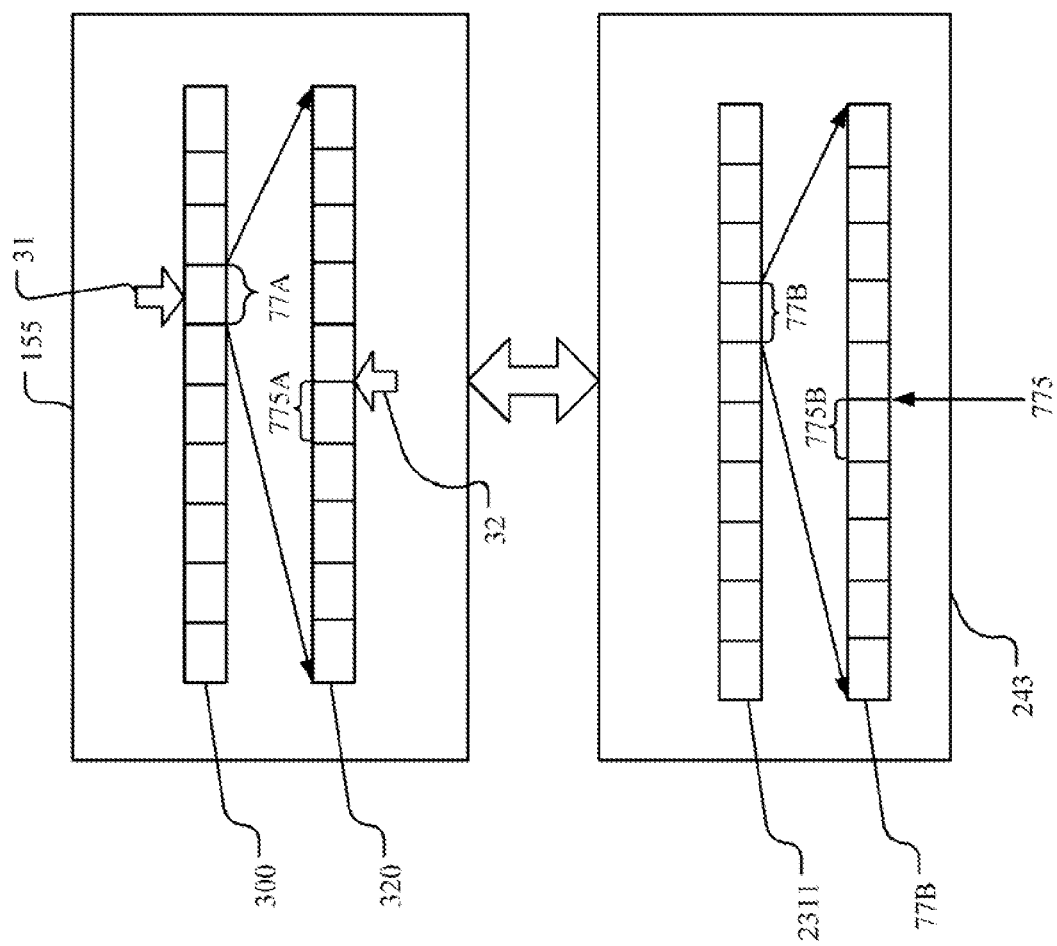

In the step S338, if the digit d is received from the I/O unit 160 before the timer 50 expires (event B), the processor 151 further interprets the located video segment as being a concatenation of z sub-segments (step S340), locates the d-th sub-segment thereof (step S342), and resets the timer 50 in response to the reception of the digit d (step S344). A length of each sub-segment is $D/z^2$. The processor 151 utilizes the length of one sub-segment $D/z^2$ as a new unit of playback skipping. In the example of FIG. 17, if z=10 and d=5, the processor 151 further interprets the located $7^{th}$ progress bar segment as being a concatenation of ten sub-segments and locates the 5-th sub-segment thereof. As shown in FIG. 18, the progress bar 320 represents the progress bar segment 77A corresponding to the video segment 77B. The processor 151 divides the progress bar 320 into ten sub-segments and locates the $5^{th}$ progress bar sub-segment 775A corresponding to video sub-segment 775B. The video sub-segment 775B may be further interpreted as being a concatenation of much smaller segments by repeating steps in FIG. 16.

If the timer 50 expires (event A), the processor 151 performs a playback operation on the located video segment (step S346). In the example of FIG. 18, the processor 151 may begin playing the section 2311 from an end position 775 of the segment 775B.

An alternative embodiment of the device 100 without numeric keys may receive an operation originally designed to move a cursor or an icon upward or downward to perform the division of the progress bar 300 or a progress bar segment and corresponding operations thereof on the section 2311. Such device may also utilize a direction key, a forward skipping key, or a backward skipping key to locate or select a segment in a target object.

3.4 Third Exemplary Embodiment of the Positioning Method

Figure 19:
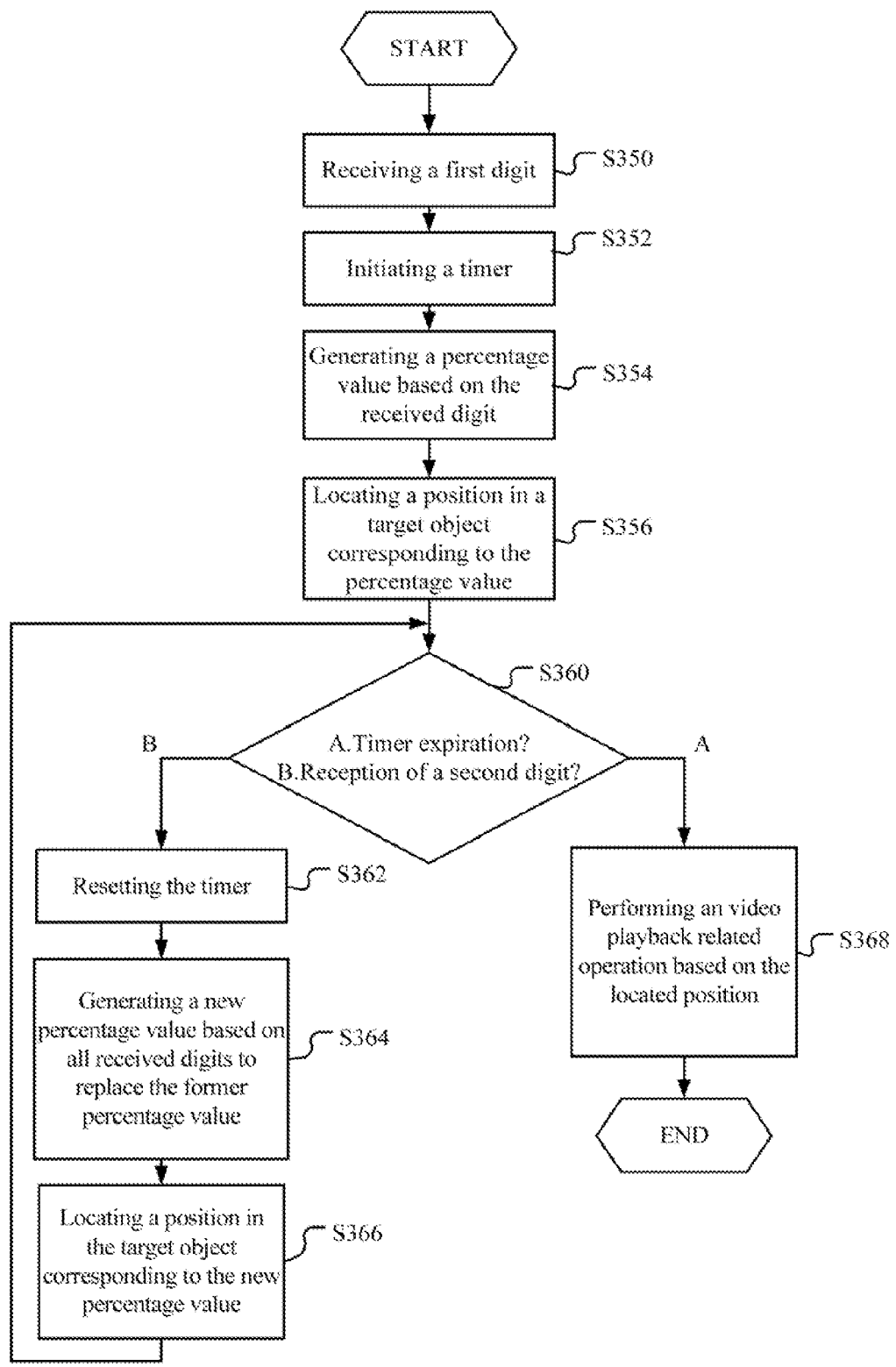
FIG. 19 is a flowchart showing a third embodiment of the media data playback positioning method.

FIG. 19 shows a third embodiment of the positioning method executed by the device 100. In the following description, the symbol "<" in the midst of a first variable and a second variable or a constant signifies that the value of the second variable or constant is assigned to the first variable.

The device 100 comprises variables $a_1$, $a_2$, $a_3$, ... and $a_n$, each with default value "0". The processor 151 orderly stores each received digit from the I/O unit 160 as one of the variables $a_1$, $a_2$, $a_3$, ... and $a_n$. With reference to FIG. 19, the processor 151 receives a first digit e and stores the digit e into variable $a_1$, that is $a_1 \leftarrow e$ (step S350), and initiates the timer 50 to keep a predetermined period of time (step S352). The processor 151 generates a percentage based on the digit e and generates an address corresponding to the percentage (step S354), and locates a position on the progress bar 300 corresponding to the percentage (step S356). For example, the processor 151 obtains the percentage from the formula:

$$x = 1\% \times \sum_{i=1}^{n} 10^{2-i} \times a_i \tag{11}$$

Figure 20:
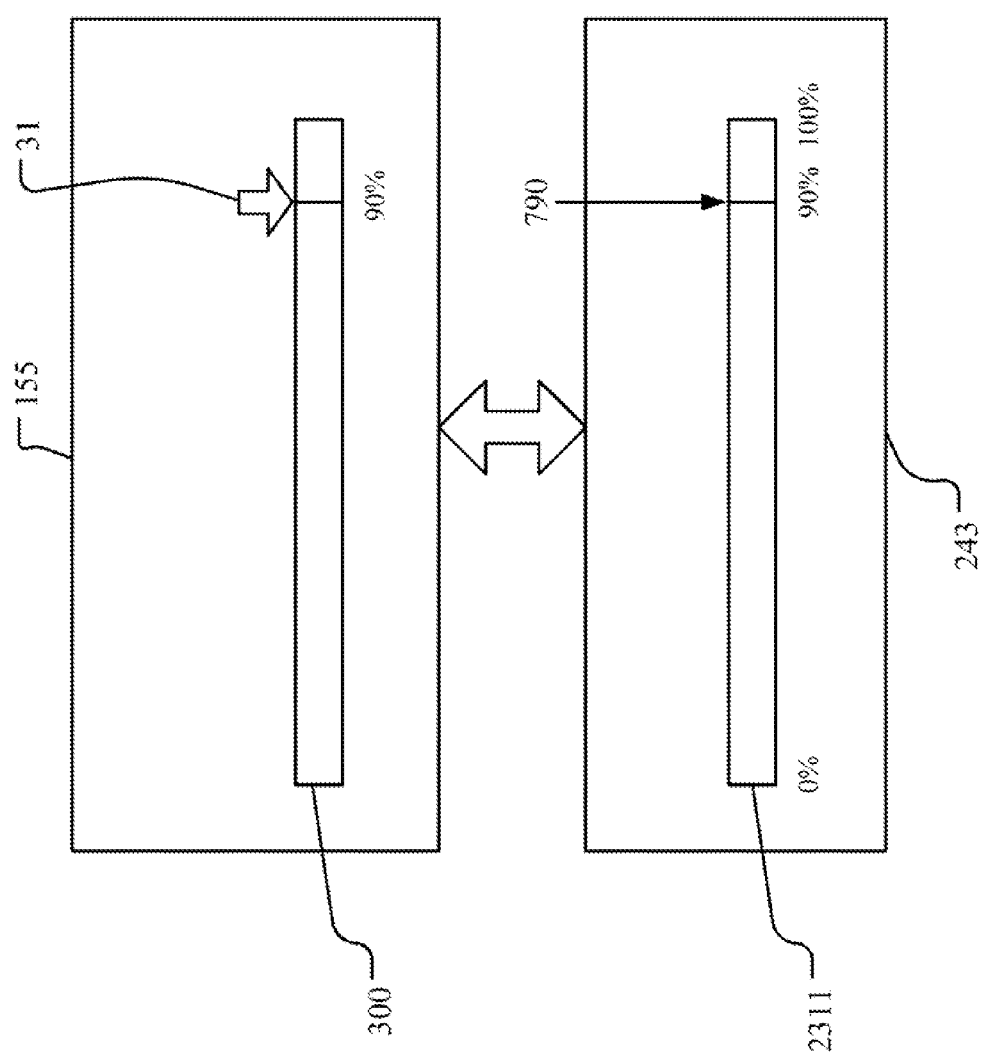
FIG. 20 is a schematic diagram showing exemplary operations of the third embodiment of the media data playback positioning method.

If the received first digit e=9, the processor 151 generates 90% based on the formula (11) and the first digit e. As shown in FIG. 20, a ratio of playback time corresponding to a position 790 to total playback time of the section 2311 is substantially equal to the generated value of 90%. The processor 151 generates an address corresponding to 90% and locates the position 790 on the section 2311 based on the address.

The processor 151 determines if the timer 50 expires (event A), and if a second digit f is received from the I/O unit 160 before the timer 50 expires (event B) (step S360). When receiving the second digit f from the I/O unit 160 before the timer 50 expires (event B), the processor 151 store the second digit f in variable $a_2$, that is $a_2 \leftarrow f$, and resets the timer 50 (step S362), and generates a new percentage in substitution for the previously generated percentage based on all received digits and generates an address corresponding to the new percentage (step S364).

For example, if e=9 and f=5, the new percentage $m_{new}$=95%, or if e=0 and f=5, the new percentage $m_{new}$=5%

The processor 151 locates a position on the progress bar 300 and a position on the section 2311 corresponding to the new percentage (step S366) and repeat step S360.

If the timer 50 expires (event A), the processor 151 performs a playback operation on the located position (step S368).

4. Conclusion

In conclusion, the disclosed media data playback device is capable of simultaneously parsing and decoding two different sections of a streaming media, one of which comprises a replay section. The device shows replay progress of the replay section on a progress bar based on PCR, PTS, or DTS and allows switching positions to replay the buffered section by responding to digit input or contact operations.

It is to be understood, however, that even though numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A media data playback device, comprising:
a receiver operable to receive a media data stream;
a buffer unit comprising a first buffer, a second buffer and a third buffer;
a capture unit operable to duplicate and store a first section of the media data stream as a first copy and a second copy in the first and second buffer respectively, generate and store a third copy of the second copy in the third buffer in response to a replay command, wherein the first copy and the second copy in the first and second buffers are updated by a second section of the media data stream;
a parser unit operable to simultaneously parse the second section from the first buffer utilizing a first parser of the parser unit and parse the third copy from the third buffer utilizing a second parser of the parser unit;
a decoder unit operable to simultaneously decode the parsed second section utilizing a first decoder of the decoder unit and decode the parsed third copy utilizing a second decoder of the decoder unit; and
a composer operable to compose viewable signals from the decoded third copy and the decoded second section.

2. The media data playback device system as claimed in claim 1, wherein the media data playback device is electronically connected to a display, when presenting a first presentation unit of the third copy, the composer displays on the display a progress bar showing a position of the first presentation unit relative to the length of the third copy.

3. The media data playback device system as claimed in claim 2, further comprising a locater operable to receive a selected position on the progress bar, and locate a second presentation unit from the third copy according to the selected position, wherein the composer displays the located second presentation unit in response to the reception of the selection position.

4. The media data playback device system as claimed in claim 3, wherein the first presentation unit comprises a unit of a packetized elementary stream, a transport stream, or a flash video stream.

5. The media data playback device system as claimed in claim 4, further comprising a progress bar renderer operable to compute the length of the third copy and the position of the first presentation unit in the third copy relative to the length of the third copy based on program clock references in transport stream packets of the third copy, or presentation time-stamps or decoding time-stamps in packetized elementary stream packets of the third copy, or a timestamp in flash video stream packets of the third copy.

6. The media data playback device system as claimed in claim 3, wherein the media data playback device plays entirety of the third copy in response to the replay command, when receiving two selected delimiting points on the progress bar, the locater locates two delimiting presentation units in the third copy based on the two selected delimiting points, and the media data playback device plays a portion of the third copy delimited by the two delimiting presentation units in response to a subsequent replay command 7. The media data playback device system as claimed in claim 3, further comprising:
a processor operable to execute a positioning method to locate the selected position, the method comprising:
obtaining by the processor a proportion of a length of the third copy as a length of a first video segment in the third copy;
utilizing the length of the first video segment as a first operating unit of video playback skipping and locating a second video segment in the third copy through a first video playback skipping operation thereon in the first operating unit by the processor;
obtaining by the processor a proportion of a length of the second video segment as a length of a video sub-segment in the second video segment; and
utilizing the length of the video sub-segment as a second operating unit of video playback skipping and locating the selected position in the second video segment through a second playback skipping operation thereon in the second operating unit by the processor.

8. The media data playback device system as claimed in claim 3, further comprising:
a timer operable to count a predetermined period of time;
an input device responsive to operations thereon for generating input signals of numbers; and
a processor operable to execute a positioning method to locate the selected position, the method comprising:
receiving a digit N from the input device and initiating the timer;
locating the N-th video segment in the third copy in response to the reception of the digit N;
determining whether the processor receives another digit M from the input device before the timer expires;
performing a first playback operation on the N-th video segment if the timer expires without reception of such digit M, wherein the selected position comprises a position on the N-th video segment;

locating the M-th video sub-segment in the N-th video segment and resetting the timer if the processor receives the digit M from the input device before the timer expires; and performing a second playback operation on the M-th video sub-segment in response to expiration of the timer after reception of the digit M, wherein the selected position comprises a position on the M-th video sub-segment.

9. The media data playback device system as claimed in claim 8, wherein the input device comprises a touch panel, and the processor generates the digit N or M in response to operations on the touch panel.

10. The media data playback device system as claimed in claim 8, wherein the input device comprises numeric keys, and the processor generates the digit N or M in response to operations on a numeric key.

11. An video replay method executable in a media data playback device, wherein the media data playback device is electrically connectable to a display device and comprises a first buffer, a second buffer and a third buffer, the method comprising:

receiving a media data stream;

duplicating and storing a first section of the media data stream as a first copy and a second copy in the first and second buffer respectively;

generating and storing a third copy of the second copy in the third buffer in response to a replay command, wherein the first copy and the second copy in the first and second buffers are updated by a second section of the media data stream;

simultaneously parsing the second section from the first buffer and the third copy from the third buffer respectively utilizing a first parser and a second parser of the media data playback device;

simultaneously decoding the parsed second section and the parsed third copy respectively utilizing a first decoder and a second decoder of the media data playback device; and composing and displaying viewable signals from the decoded third copy and the decoded second section on the display device.

12. The video replay method as claimed in claim 11, further comprising:

displaying on the display device a progress bar showing a position of a first presentation unit of the third copy relative to the length of the third copy during presentation of the first presentation unit.

13. The video replay method as claimed in claim 12, further comprising:

receiving a selected position on the progress bar; and locating a second presentation unit from the third copy according to the selected position; and displaying the located second presentation unit in response to the reception of the selection position.

14. The video replay method as claimed in claim 13, wherein the first presentation unit comprises a unit of a packetized elementary stream or a transport stream, or a flash video stream.

15. The video replay method as claimed in claim 14, further comprising:

computing the length of the third copy and the position of the first presentation unit in the third copy relative to the length of the third copy based on program clock references in transport stream packets of the third copy, or presentation time-stamps or decoding time-stamps in packetized elementary stream packets of the third copy, or a timestamp in flash video stream packets of the third copy.

16. The video replay method as claimed in claim 13, wherein the media data playback device plays entirety of the third copy in response to the replay command, further comprising:

receiving two selected delimiting points on the progress bar;

locating two delimiting presentation units in the third copy based on the two selected delimiting points; and playing a portion of the third copy delimited by the two delimiting presentation units in response to a subsequent replay command.

17. The video replay method as claimed in claim 13, wherein the media data playback device comprises a processor, further comprising:

obtaining by the processor a proportion of a length of the third copy as a length of a first video segment in the third copy;

utilizing the length of the first video segment as a first operating unit of video playback skipping and locating a second video segment in the third copy through a first video playback skipping operation thereon in the first operating unit by the processor;

obtaining by the processor a proportion of a length of the second video segment as a length of a video sub-segment in the second video segment; and utilizing the length of the video sub-segment as a second operating unit of video playback skipping and locating the selected position in the second video segment through a second playback skipping operation thereon in the second operating unit by the processor.

18. The video replay method as claimed in claim 13, wherein the media data playback device comprises a processor, further comprising:

a timer operable to count a predetermined period of time;

an input device responsive to operations thereon for generating input signals of numbers; and a processor operable to execute a positioning method to locate the selected position, the method comprising:

receiving a digit N from the input device and initiating the timer;

locating the N-th video segment in the third copy in response to the reception of the digit N;

determining whether the processor receives another digit M from the input device before the timer expires;

performing a first playback operation on the N-th video segment if the timer expires without reception of such digit M, wherein the selected position comprises a position on the N-th video segment;

locating the M-th video sub-segment in the N-th video segment and resetting the timer if the processor receives the digit M from the input device before the timer expires; and performing a second playback operation on the M-th video sub-segment in response to expiration of the timer after reception of the digit M, wherein the selected position comprises a position on the M-th video sub-segment.

* * * * *